United States Patent
Wu et al.

(10) Patent No.: US 10,581,729 B2
(45) Date of Patent: Mar. 3, 2020

(54) NETWORK INTERFACE CARD, COMPUTING DEVICE, AND DATA PACKET PROCESSING METHOD

(71) Applicant: HUAWEI TECHNOLOGIES CO., LTD., Shenzhen, Guangdong (CN)

(72) Inventors: Tianyi Wu, Shenzhen (CN); Zhongjun Zhang, Shenzhen (CN); Tao Gan, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/927,005

(22) Filed: Mar. 20, 2018

(65) Prior Publication Data
US 2018/0219770 A1    Aug. 2, 2018

Related U.S. Application Data

(63) Continuation of application No. PCT/CN2016/093098, filed on Aug. 3, 2016.

(51) Int. Cl.
*H04L 12/721* (2013.01)
*G06F 13/14* (2006.01)
(Continued)

(52) U.S. Cl.
CPC .......... *H04L 45/38* (2013.01); *G06F 9/45558* (2013.01); *G06F 13/14* (2013.01);
(Continued)

(58) Field of Classification Search
CPC . H04L 12/4633; H04L 12/4641; H04L 45/38; H04L 45/64; H04L 49/70; G06F 9/45558; G06F 13/14
See application file for complete search history.

(56) References Cited

U.S. PATENT DOCUMENTS

2008/0031260 A1  2/2008  Polland
2010/0135182 A1  6/2010  Yoon et al.
(Continued)

FOREIGN PATENT DOCUMENTS

CN   102780608 A   11/2012
CN   103140830 A   6/2013
(Continued)

OTHER PUBLICATIONS

English translation of ISR for PCT/CN2016/093098, dated Mar. 29, 2017 (Year: 2017).*
(Continued)

*Primary Examiner* — Benjamin H Elliott, IV
(74) *Attorney, Agent, or Firm* — Womble Bond Dickinson (US) LLP

(57) ABSTRACT

This application discloses a data packet processing method applied to a computing device in software-defined networking. After receiving a data packet of a data flow, a NIC in the computing device queries a flow table set according to matching information of the data packet; and if a flow table is obtained from the flow table set, the NIC processes the data packet according to the flow table; or if no flow table can be obtained from the flow table set, the NIC sends the data packet to a virtual switch, and the virtual switch obtains a flow table corresponding to the data flow, and saves the flow table into the flow table set, so that the NIC can directly process a subsequent data packet of the data flow. An operating load of the virtual switch is reduced, and operating efficiency of the computing device is improved.

21 Claims, 11 Drawing Sheets

(51) Int. Cl.
  *G06F 9/455* (2018.01)
  *H04L 12/46* (2006.01)
  *H04L 12/715* (2013.01)
  *H04L 12/931* (2013.01)

(52) U.S. Cl.
  CPC ...... *H04L 12/4633* (2013.01); *H04L 12/4641* (2013.01); *H04L 45/64* (2013.01); *H04L 49/70* (2013.01); *G06F 2009/45595* (2013.01)

(56) References Cited

U.S. PATENT DOCUMENTS

| | | | |
|---|---|---|---|
| 2012/0084487 A1 | 4/2012 | Barde | |
| 2013/0010799 A1 | 1/2013 | Biwas et al. | |
| 2013/0151685 A1 | 6/2013 | Bursell | |
| 2013/0254766 A1* | 9/2013 | Zuo | H04L 47/20 718/1 |
| 2013/0266007 A1 | 10/2013 | Kumbhare et al. | |
| 2014/0108632 A1 | 4/2014 | Narasimha et al. | |
| 2014/0328350 A1 | 11/2014 | Hao et al. | |
| 2015/0026681 A1* | 1/2015 | Lin | G06F 9/45533 718/1 |
| 2015/0043576 A1 | 2/2015 | Dixon et al. | |
| 2015/0135254 A1* | 5/2015 | Thilenius | H04L 63/02 726/1 |
| 2015/0139238 A1* | 5/2015 | Pourzandi | H04L 45/42 370/392 |
| 2015/0180959 A1 | 6/2015 | Bloch et al. | |
| 2015/0205624 A1 | 7/2015 | Zhang et al. | |
| 2015/0281067 A1* | 10/2015 | Wu | H04L 61/103 370/392 |
| 2015/0347175 A1* | 12/2015 | DeCusatis | G06F 9/45545 718/1 |
| 2015/0365325 A1* | 12/2015 | Hwang | H04L 47/70 370/230 |
| 2015/0381494 A1* | 12/2015 | Cherian | H04L 45/745 370/392 |
| 2016/0142301 A1* | 5/2016 | Anand | H04L 45/54 370/389 |
| 2016/0197824 A1 | 7/2016 | Lin et al. | |
| 2016/0203030 A1 | 7/2016 | Tateishi et al. | |
| 2016/0212772 A1 | 7/2016 | Chen et al. | |
| 2016/0373337 A1 | 12/2016 | Decusatis et al. | |
| 2017/0031704 A1* | 2/2017 | Sudhakaran | G06F 9/45558 |
| 2017/0118173 A1* | 4/2017 | Arramreddy | H04L 63/0236 |
| 2017/0212864 A1* | 7/2017 | Leitner | H04L 45/745 |
| 2018/0212869 A1* | 7/2018 | Wu | H04L 45/38 |
| 2018/0219770 A1* | 8/2018 | Wu | G06F 9/45558 |

FOREIGN PATENT DOCUMENTS

| | | |
|---|---|---|
| CN | 103346981 A | 10/2013 |
| CN | 203490899 U | 3/2014 |
| CN | 103856573 A | 6/2014 |
| CN | 103873374 A | 6/2014 |
| CN | 103916314 A | 7/2014 |
| CN | 104067231 A | 9/2014 |
| CN | 104205080 A | 12/2014 |
| CN | 104660574 A | 5/2015 |
| CN | 104717156 A | 6/2015 |
| CN | 104731521 A | 6/2015 |
| CN | 105718301 A | 6/2016 |
| CN | 106155551 A | 11/2016 |
| WO | 2015173759 A1 | 11/2015 |

OTHER PUBLICATIONS

Anonymous: "Virtualization Techniques", May 27, 2013, pp. 1-63, XP055512773.

ConnectX®-4 Lx EN, Ethernet Adapter Cards, Product Brief, ©2015 Mellanox Technologies, 3 pages.

ConnectX®-4 Ethernet Single and Dual Port QASFP28 Adapter Card User Manual, Rev 1.8, Mellanox Technologies, MLNX-15-5612, 2016, 80 pages.

* cited by examiner

NETWORK INTERFACE CARD, COMPUTING DEVICE, AND DATA PACKET PROCESSING METHOD

CROSS-REFERENCE TO RELATED APPLICATIONS

This application is a continuation of International Application No. PCT/CN2016/093098, filed on Aug. 3, 2016, the disclosure of which is hereby incorporated by reference in its entirety.

TECHNICAL FIELD

This application relates to the field of computer technologies, and in particular, to a network interface card (NIC), a computing device for processing a data packet, and a data packet processing method separately executed by the NIC and the computing device.

BACKGROUND

In a cloud computing environment, a service needs to be provided for a relatively large quantity of users. Therefore, there is usually a relatively large quantity of computing devices in a data center for providing a cloud service. In addition, multiple virtual machines (VM), for example, a VM-1 to a VM-n in FIG. 1, run on each computing device. A VM communicates, by using a virtual switch (VS), with a VM running on another computing device or a VM on the same computing device. A software-defined networking (SDN) controller centrally controls virtual switches on all computing devices. Currently, a common virtual switch includes an open vSwitch. The SDN controller generally controls all virtual switches by using a flow table defined in the OpenFlow™ protocol.

Hardware resources on each computing device need to support running of at least multiple VMs, a virtual switch, and a virtual machine monitor. The virtual machine monitor is also referred to as a virtual machine manager or a hypervisor. Each computing device has limited hardware resources. If a virtual switch responsible for a data exchanging task occupies excessive hardware resources, running of a VM on the computing device is easily affected, and operating efficiency is reduced.

SUMMARY

This application provides a data packet processing method, to improve data packet processing efficiency.

According to a first aspect of this application, a data packet processing method is provided, where the method is applied to a computing device, the computing device includes a network interface card NIC and a host, the NIC establishes a communications connection to the host, a virtual machine VM runs on the host. The method includes: receiving, by the NIC, a first data packet of a data flow; querying, by the NIC, a flow table set according to matching information of the first data packet; and when a flow table corresponding to the data flow cannot be obtained by means of matching, forwarding, by the NIC, the first data packet to a virtual switch running on the host. In response to receiving the first data packet from the NIC, the virtual switch obtains the flow table corresponding to the data flow from an SDN controller, so that the flow table corresponding to the data flow is added to the flow table set.

After the virtual switch obtains the flow table corresponding to the data flow based on the first data packet, the virtual switch or a monitoring module running on the host saves the flow table corresponding to the data flow into the flow table set.

Thereafter, in response to receiving a subsequent data packet, the NIC queries a flow table set according to matching information of the data packet. If a flow table corresponding to a data flow which comprises the data packet cannot be obtained, it indicates that the data packet is the first overall data packet of the data flow which comprises the data packet, or the data packet is not the first data packet of the data flow which comprises the data packet, but a flow table corresponding to the data flow in the flow table set is aged.

In a data packet processing method, the NIC executes an action of performing matching between a flow table and a data packet, to improve data packet processing efficiency, and sends, to the virtual switch, a data packet that cannot match a flow table, to obtain a corresponding flow table used by the NIC to process a subsequent data packet of the data flow.

According to one embodiment, at least one virtual switch port is configured on the virtual switch running on a host, each virtual switch port corresponding to one VM running on the host, and before receiving, by the NIC, the first data packet, the method further includes: receiving, by the NIC, configuration information of the virtual switch port; and configuring, by the NIC, at least one NIC port on the NIC according to the configuration information of the virtual switch port, where each NIC port connects, using a single-root input/output virtualization (SR-I/OV) technology, to one VM running on the host.

Configuration of the virtual switch port and the NIC port may be completed before the data packet processing method provided in the first aspect, and a NIC driver running on the host may send the configuration information of the virtual switch port to the NIC.

In one embodiment, the flow table corresponding to the data flow includes data packet routing information of the data flow, and after forwarding the first data packet to the virtual switch, the method further includes: querying, by the NIC, the flow table set according to the matching information of the first data packet, to obtain the flow table corresponding to the data flow, and forwards the first data packet to a destination VM according to the data packet routing information of the data flow. The data packet routing information of the data flow indicates a NIC port corresponding to the destination VM.

After the virtual switch or the monitoring module running on the host saves the flow table corresponding to the data flow into the flow table set, the NIC queries the flow table set according to the matching information of the first data packet, and in this case, the flow table corresponding to the data flow has been stored in the flow table set. After sending the first data packet to the virtual switch, the NIC may periodically perform matching between the first data packet and a flow table in the flow table set. Alternatively, after the flow table corresponding to the data flow is saved into the flow table set, a notification message is sent to the NIC, to instruct the NIC to perform matching between the first data packet and a flow table in the flow table set.

In this implementation manner, the virtual switch does not need to perform matching between the first data packet and a flow table, thereby reducing an operating load of the virtual switch.

According to one embodiment, the flow table corresponding to the data flow includes data packet routing information of the data flow, and after forwarding the first data packet to the virtual switch, the method further includes: receiving, by the NIC, a first data packet returned by the virtual switch, where the returned first data packet includes a port identifier corresponding to a destination VM, and the port identifier is a virtual switch port identifier or a NIC port identifier; and forwarding, by the NIC, the first data packet to the destination VM according to the port identifier. The port identifier is added by the virtual switch according to the data packet routing information of the data flow.

In this implementation manner, the NIC does not need to perform matching for the first data packet, thereby improving the data packet processing efficiency.

According to another embodiment, the virtual switch communicates with the NIC using at least one queue, and each queue is corresponding to one VM running on the host; and after forwarding the first data packet to the virtual switch, the method further includes: receiving, by the NIC, the first data packet from a queue corresponding to a destination VM of the first data packet; and forwarding, by the NIC according to queue information of the queue corresponding to the destination VM, the first data packet to the destination VM from a NIC port corresponding to the destination VM.

After obtaining data packet routing information of the data flow, the virtual switch saves the first data packet in the queue corresponding to the destination VM according to the data packet routing information of the data flow. The NIC receives the first data packet from the queue corresponding to the destination VM. The NIC driver running on the host sends the queue information of the queue corresponding to the destination VM to the NIC. The queue information is used to notify the NIC that the first data packet is obtained from the queue corresponding to the destination VM. The NIC forwards, according to a prestored correspondence between a queue and a NIC port, the first data packet to the destination VM from the NIC port corresponding to the destination VM.

In this embodiment, the NIC does not need to perform matching for the first data packet, and the NIC does not need to convert the port identifier, thereby further improving the data packet processing efficiency.

According to a second aspect of this application, a NIC is provided, and the NIC is configured to execute the data packet processing method provided in the first aspect of this application. The NIC includes a host interface, a network interface, and a processing chip. The network interface is configured to communicate with an external network, and the network interface establishes a communications connection to the processing chip. The host interface is configured to communicate with a host, the host interface establishes a communications connection to the processing chip, and a VM runs on the host. The network interface is configured to receive a first data packet of a data flow. The processing chip is configured to: query a flow table set according to matching information of the first data packet, and when a flow table corresponding to the data flow cannot be obtained based on matching, forward, by using the host interface, the first data packet to a virtual switch running on the host. In response to receiving the first data packet, the virtual switch obtains the flow table corresponding to the data flow from an SDN controller, so that the flow table corresponding to the data flow can be added to the flow table set.

The NIC can execute an action of performing matching between a flow table and a data packet, thereby improving data packet processing efficiency, and the NIC sends, to the virtual switch, a data packet that cannot match a flow table, to obtain a corresponding flow table used by the NIC to process a subsequent data packet of the data flow.

According to one embodiment, at least one virtual switch port is configured on the virtual switch running on the host, and each virtual switch port is corresponding to one VM running on the host; and the processing chip is further configured to receive configuration information of the virtual switch port, and configure at least one NIC port on the NIC according to the configuration information of the virtual switch port. Each NIC port connects, using an SR-I/OV technology, to one VM running on the host.

According to another embodiment, the processing chip is further configured to: query the flow table set according to the matching information of the first data packet, to obtain the flow table corresponding to the data flow, where the flow table corresponding to the data flow includes data packet routing information of the data flow, and forward the first data packet to a destination VM according to the data packet routing information of the data flow.

In this embodiment, the virtual switch does not need to perform matching for the first data packet, thereby reducing an operating load of the virtual switch.

According to another embodiment, the processing chip is further configured to receive a first data packet returned by the virtual switch, where the returned first data packet includes a port identifier corresponding to a destination VM, the port identifier is a virtual switch port identifier or a NIC port identifier, the port identifier is added by the virtual switch according to data packet routing information of the data flow, and the flow table corresponding to the data flow includes the data packet routing information of the data flow; and the processing chip is further configured to forward the first data packet to the destination VM according to the port identifier.

In this embodiment, the NIC does not need to perform matching between the first data packet and a flow table, thereby improving the data packet processing efficiency.

According to another embodiment, the virtual switch communicates with the NIC using at least one queue, and each queue is corresponding to one VM running on the host; and the processing chip is further configured to receive the second data packet from a queue corresponding to a destination VM of the first data packet, and forward, according to queue information of the queue corresponding to the destination VM, the second data packet to the destination VM from a NIC port corresponding to the destination VM.

In this embodiment, the NIC does not need to perform matching between the first data packet and a flow table, and compared with the foregoing third implementation manner, the NIC does not need to convert the port identifier, thereby further improving the data packet processing efficiency.

According to a third aspect of this application, a data packet processing method is provided, where the method is applied to a computing device, the computing device includes a NIC and a host, the NIC establishes a communications connection to the host, a VM runs on the host, and the method includes: receiving, by the NIC, a second data packet of a data flow; querying, by the NIC, a flow table set according to matching information of the second data packet, to obtain a flow table corresponding to the data flow, where the flow table corresponding to the data flow includes data packet routing information of the data flow; and forwarding, by the NIC, the second data packet to a destination VM according to the data packet routing information of the data flow.

In the data packet processing method, the NIC executes an action of performing matching between a flow table and a data packet, thereby improving the data packet processing efficiency.

According to one embodiment, the NIC connects, using an SR-I/OV technology, to the VM running on the host; and the NIC forwards, according to the data packet routing information of the data flow, the second data packet to the destination VM using a connection between the NIC and the destination VM.

According to another embodiment, at least one virtual switch port is configured on a virtual switch running on the host, and each virtual switch port is corresponding to one VM running on the host; and before receiving, by the NIC, a second data packet of a data flow, the method further includes: receiving, by the NIC, configuration information of the virtual switch port; and configuring at least one NIC port on the NIC according to the configuration information of the virtual switch port, where each NIC port connects, using the SR-I/OV technology, to one VM running on the host, and the data packet routing information of the data flow indicates a NIC port corresponding to the destination VM.

According to another embodiment, before receiving, by the NIC, a second data packet of a data flow, the method further includes: receiving, by the NIC, a third data packet of the data flow; querying, by the NIC, the flow table set according to matching information of the third data packet; and when the flow table corresponding to the data flow cannot be obtained based on matching, forwarding, by the NIC, the third data packet to the virtual switch running on the host. In response to receiving the third data packet, the virtual switch obtains the flow table corresponding to the data flow from an SDN controller, so that the flow table corresponding to the data flow is added to the flow table set.

According to another embodiment, after the forwarding the third data packet to the virtual switch, the method further includes: querying, by the NIC, the flow table set according to the matching information of the third data packet, to obtain the flow table corresponding to the data flow, and forwarding the third data packet to the destination VM according to the data packet routing information of the data flow.

According to another embodiment, after the forwarding the third data packet to the virtual switch, the method further includes: receiving, by the NIC, a third data packet returned by the virtual switch, where the returned third data packet includes a port identifier corresponding to the destination VM, the port identifier is a virtual switch port identifier or a NIC port identifier, and the port identifier is added by the virtual switch according to the data packet routing information of the data flow; and forwarding, by the NIC, the third data packet to the destination VM according to the port identifier.

According to another embodiment, the virtual switch communicates with the NIC using at least one queue, and each queue is corresponding to one VM running on the host; and after forwarding the third data packet to the virtual switch, the method further includes: receiving, by the NIC, the third data packet from a queue corresponding to the destination VM; and forwarding, by the NIC according to queue information of the queue corresponding to the destination VM, the third data packet to the destination VM from the NIC port corresponding to the destination VM.

According to another embodiment, the operation of receiving, by the NIC, a second data packet of a data flow includes: receiving, by the NIC, an overlay-type data packet. The overlay-type data packet includes an overlay header and the second data packet, the overlay header includes a Virtual Extensible Local Area Network (VXLAN) header, a Network Virtualization using Generic Routing Encapsulation (NVGRE) header, or a Stateless Transport Tunneling (STT) header. The operation further includes stripping, by the NIC, the overlay header of the overlay-type data packet, to obtain the second data packet.

It should be noted that if an overlay technology is used for all data packets of the data flow, the NIC also needs to strip an overlay header corresponding to the third data packet, to obtain the third data packet. In this embodiment, it is provided as an example that the NIC strips the overlay-type data packet. Actually, after receiving another overlay-type data packet of the data flow, the NIC also strips an overlay header to obtain an inside data packet.

In this embodiment, the NIC implements stripping of the overlay header, thereby reducing an operating load of the host.

According to another embodiment, before forwarding, by the NIC, the second data packet to a destination VM, the method further includes: performing, by the NIC, a security group check on the second data packet, and after the NIC determines that the second data packet passes the security group check, forwarding the second data packet to the destination VM.

It should be noted that if a security group is configured for all the data packets of the data flow, the NIC does not forward the third data packet until the NIC determines that the third data packet passes a security group check. In this implementation manner, it is provided as an example that the NIC performs the security group check on the second data packet. Actually, before forwarding another data packet of the data flow, the NIC also needs to perform a security group check on the another data packet.

In this embodiment, the NIC further implements the security group check on the second data packet, thereby improving data packet receiving and sending security and further reducing an operating load of the host.

According to a fourth aspect of this application, a NIC is provided, and the NIC is configured to execute the data packet processing method provided in the third aspect. The NIC includes a host interface, a network interface, and a processing chip. The network interface is configured to communicate with an external network, and the network interface establishes a communications connection with the processing chip. The host interface is configured to communicate with a host, the host interface establishes a communications connection to the processing chip, and a VM runs on the host. The network interface is configured to receive a second data packet of a data flow. The processing chip is configured to: query a flow table set according to matching information of the second data packet, to obtain a flow table corresponding to the data flow, where the flow table corresponding to the data flow includes data packet routing information of the data flow; and forward the second data packet to a destination VM according to the data packet routing information of the data flow.

According to one embodiment, the NIC connects, using an SR-I/OV technology, to the VM running on the host; and the processing chip is configured to forward, according to the data packet routing information of the data flow, the second data packet to the destination VM using a connection between the NIC and the destination VM.

According to another embodiment, at least one virtual switch port is configured on a virtual switch running on the host, and each virtual switch port is corresponding to one VM running on the host; and the processing chip is further configured to receive configuration information of the virtual switch port, and configure at least one NIC port on the NIC according to the configuration information of the virtual switch port. Each NIC port connects, using the SR-I/OV technology, to one VM running on the host. The data packet routing information of the data flow indicates a NIC port corresponding to the destination VM.

According to another embodiment, the network interface is further configured to receive a third data packet of the data flow; and the processing chip is further configured to: query the flow table set according to matching information of the third data packet, and when the flow table corresponding to the data flow cannot be obtained by means of matching, forward the third data packet to the virtual switch running on the host. After receiving the third data packet, the virtual switch obtains the flow table corresponding to the data flow from an SDN controller, so that the flow table corresponding to the data flow is added to the flow table set.

According to another embodiment, the processing chip is further configured to: query the flow table set according to the matching information of the third data packet, to obtain the flow table corresponding to the data flow, and forward the third data packet to the destination VM according to the data packet routing information of the data flow.

According to another embodiment, the processing chip is further configured to receive a third data packet returned by the virtual switch, where the returned third data packet includes a port identifier corresponding to the destination VM, the port identifier is a virtual switch port identifier or a NIC port identifier, and the port identifier is added by the virtual switch according to the data packet routing information of the data flow; and the processing chip is further configured to forward the third data packet to the destination VM according to the port identifier.

According to another embodiment, the virtual switch communicates with the NIC using at least one queue, and each queue is corresponding to one VM running on the host; and the processing chip is further configured to receive the third data packet from a queue corresponding to the destination VM, and forward, according to queue information of the queue corresponding to the destination VM, the third data packet to the destination VM from the NIC port corresponding to the destination VM.

According to another embodiment, the network interface is configured to receive an overlay-type data packet, where the overlay-type data packet includes an overlay header and the second data packet, the overlay header includes a VXLAN header, an NVGRE header, or an STT header; and the processing chip is configured to strip the overlay header of the overlay-type data packet, to obtain the second data packet.

According to another embodiment, before forwarding the second data packet to the destination VM, the processing chip is further configured to perform a security group check on the second data packet, and after the processing chip determines that the second data packet passes the security group check, the processing chip forwards the second data packet to the destination VM.

According to a fifth aspect of this application, a computing device is provided. The computing device includes a NIC and a host, the NIC establishes a communications connection with the host, a VM and a virtual switch run on the host. At least one virtual switch port is configured on the virtual switch, and each virtual switch port is corresponding to one VM running on the host. The host is configured to send configuration information of the virtual switch port to the NIC and the NIC is configured to configure at least one NIC port on the NIC according to the configuration information of the virtual switch port. Each NIC port connects, using an SR-I/OV technology, to a VM running on the host. The NIC is further configured to receive a second data packet of a data flow; to query a flow table set according to matching information of the second data packet, to obtain a flow table corresponding to the data flow, where the flow table corresponding to the data flow includes data packet routing information of the data flow, and the data packet routing information of the data flow indicates a NIC port corresponding to a destination VM; and forward the first data packet to the destination VM according to the data packet routing information of the data flow.

According to one embodiment, the NIC is further configured to receive a third data packet of the data flow, query the flow table set according to matching information of the third data packet, and when the flow table corresponding to the data flow cannot be obtained based on matching, forward the third data packet to the host. The host is configured to: after receiving the third data packet, obtain the flow table corresponding to the data flow from an SDN controller, so that the flow table corresponding to the data flow is added to the flow table set.

Specifically, the NIC sends the third data packet to the virtual switch running on the host.

According to another embodiment, the NIC is further configured to: query the flow table set according to the matching information of the third data packet, to obtain the flow table corresponding to the data flow, and forward the third data packet to the destination VM according to the data packet routing information of the data flow.

After the flow table corresponding to the data flow has been added to the flow table set, the NIC queries the flow table set according to the matching information of the third data packet.

According to another embodiment, the host is further configured to generate a returned third data packet, where the returned third data packet includes a port identifier corresponding to the destination VM, the port identifier is a virtual switch port identifier or a NIC port identifier, and the port identifier is added by the host according to the data packet routing information of the data flow; and the NIC is further configured to receive the returned third data packet, and forward the third data packet to the destination VM according to the port identifier.

According to another embodiment, the virtual switch communicates with the NIC using at least one queue, and each queue is corresponding to one VM running on the host; the host is further configured to send the third data packet to a queue corresponding to the destination VM; and the NIC is further configured to receive the third data packet from the queue corresponding to the destination VM, and forward, according to queue information of the queue corresponding to the destination VM, the third data packet to the destination VM from the NIC port corresponding to the destination VM.

After receiving the third data packet sent by the NIC, the host sends the third data packet to the queue corresponding to the destination VM.

According to another embodiment, the NIC is specifically configured to receive an overlay-type data packet, where the overlay-type data packet includes an overlay header and the second data packet, the overlay header includes a VXLAN header, an NVGRE header, or an STT header; and strip the overlay header of the overlay-type data packet, to obtain the second data packet.

According to another embodiment, before forwarding the second data packet to the destination VM, the NIC is further configured to perform a security group check on the second data packet, and after the NIC determines that the second data packet passes the security group check, the NIC forwards the second data packet to the destination VM.

According to a sixth aspect of this application, a data packet processing method is provided. The method includes: sending, by a host, configuration information of a virtual switch port to a NIC; configuring at least one NIC port on the NIC according to the configuration information of the virtual switch port, where each NIC port connects, using an SR-I/OV technology, to one VM running on the host; receiving, by the NIC, a second data packet of a data flow, and querying a flow table set according to matching information of the second data packet, to obtain a flow table corresponding to the data flow, where the flow table corresponding to the data flow includes data packet routing information of the data flow, and the data packet routing information of the data flow indicates a NIC port corresponding to a destination VM; and forwarding the second data packet to the destination VM according to the data packet routing information of the data flow.

According to one embodiment, the method further includes: receiving, by the NIC, a third data packet of the data flow, querying the flow table set according to matching information of the third data packet, and when the flow table corresponding to the data flow cannot be obtained based on matching, forwarding the third data packet to the host; and after receiving the third data packet, obtaining, by the host, the flow table corresponding to the data flow from an SDN controller, so that the flow table corresponding to the data flow is added to the flow table set.

According to another embodiment, after the flow table corresponding to the data flow has been added to the flow table set, the method further includes: querying, by the NIC, the flow table set according to the matching information of the third data packet, to obtain the flow table corresponding to the data flow, and forwarding the third data packet to the destination VM according to the data packet routing information of the data flow.

According to another embodiment, after forwarding, by the NIC, the third data packet to the host, the method further includes: generating, by the host, a returned third data packet, where the returned third data packet includes a port identifier corresponding to the destination VM, the port identifier is a virtual switch port identifier or a NIC port identifier, and the port identifier is added by the host according to the data packet routing information of the data flow; and receiving, by the NIC, the returned third data packet, and forwarding the third data packet to the destination VM according to the port identifier.

According to another embodiment, the virtual switch communicates with the NIC using at least one queue, and each queue is corresponding to one VM running on the host; and after the forwarding, by the NIC, the third data packet to the host, the method further includes: sending, by the host, the third data packet to a queue corresponding to the destination VM; and receiving, by the NIC, the third data packet from the queue corresponding to the destination VM, and forwarding, according to queue information of the queue corresponding to the destination VM, the third data packet to the destination VM from the NIC port corresponding to the destination VM.

According to another embodiment, the operation of receiving, by the NIC, a second data packet specifically includes: receiving, by the NIC, an overlay-type data packet, where the overlay-type data packet includes an overlay header and the second data packet, the overlay header includes a VXLAN header, an NVGRE header, or an STT header; and stripping, by the NIC, the overlay header of the overlay-type data packet, to obtain the second data packet.

According to another embodiment, before the forwarding, by the NIC, the second data packet to the destination VM, the method further includes: performing, by the NIC, a security group check on the second data packet, and after the NIC determines that the second data packet has passed the security group check, forwarding the second data packet to the destination VM.

According to a seventh aspect of this application, a configuration method is provided. The configuration method is applied to a host, the host establishes a communications connection with a NIC, and a VM, a virtual switch, and a NIC driver run on the host. At least one virtual switch port is configured on the virtual switch running on the host, and each virtual switch port is corresponding to one VM running on the host. The method includes: sending, by the NIC driver, configuration information of the virtual switch port to the NIC, where the configuration information of the virtual switch port indicates that at least one NIC port is configured on the NIC, and each NIC port connects, using an SR-I/OV technology, to one VM running on the host.

According to an eighth aspect of this application, a data packet processing method is provided, and the method is applied to a host that executes the configuration method provided in the seventh aspect of this application. During operations, the host executes a host side part in the data packet processing method provided in the fifth aspect of this application. The method includes: receiving, by a virtual switch running on the host, a third data packet of a data flow; obtaining, by the virtual switch, a flow table corresponding to the data flow from an SDN controller; and adding, by the virtual switch or a monitoring module running on the host, the flow table corresponding to the data flow to a flow table set.

According to one embodiment, after the adding the flow table corresponding to the data flow to a flow table set, the method further includes: sending, by the virtual switch, a notification message to the NIC, where the notification message is used to notify the NIC that the flow table corresponding to the data flow has been added to the flow table set, so that the NIC processes the third data packet according to the flow table that is in the flow table set and that is corresponding to the data flow.

According to another embodiment, the flow table corresponding to the data flow includes data packet routing information of the data flow, and the method further includes: generating, by the virtual switch, a returned third data packet according to the data packet routing information of the data flow, and sending the returned third data packet to the NIC, where the returned third data packet includes a port identifier corresponding to a destination VM, and the port identifier is a virtual switch port identifier or a NIC port identifier, so that the NIC forwards the third data packet to the destination VM according to the port identifier.

According to another embodiment, the virtual switch communicates with the NIC using at least one queue, each queue is corresponding to one VM running on the host, and the method further includes: sending, by the virtual switch, the third data packet to a queue corresponding to a destination VM; and sending, by a NIC driver, queue information of the queue corresponding to the destination VM to the NIC, so that the NIC forwards, according to the queue information of the queue corresponding to the destination VM, the third data packet to the destination VM from a NIC port corresponding to the destination VM.

According to a ninth aspect of this application, a host is provided. The host includes a processor, a memory, and a bus. The processor and the memory establish a communications connection via the bus. During operations, the processor executes the configuration method provided in the seventh aspect.

According to a tenth aspect of this application, a host is provided. The host includes a processor, a memory, and a bus. The processor and the memory establish a communications connection by using the bus. During operations, the processor executes the data packet processing method provided in any one of the eighth aspect or the implementation manners of the eighth aspect.

According to an eleventh aspect of this application, a storage medium is provided. The storage medium stores program code, and when the program code is executed by a computing device, the configuration method provided in the seventh aspect is executed. The storage medium includes, but is not limited to, a Flash memory, a hard disk (HDD), or a solid state drive (SSD).

According to a twelfth aspect of this application, a storage medium is provided. The storage medium stores program code, and when the program code is executed by a computing device, the data packet processing method provided in any one of the eighth aspect or the implementation manners of the eighth aspect is executed. The storage medium includes but is not limited to a Flash memory, an HDD, or an SSD.

According to a thirteenth aspect of this application, a computer program product is provided, and the computer program product may be a software installation package. When the software installation package is executed by a computing device, the configuration method provided in the seventh aspect is executed.

According to a fourteenth aspect of this application, a computer program product is provided, and the computer program product may be a software installation package. When the software installation package is executed by a computing device, the data packet processing method provided in any one of the eighth aspect or the implementation manners of the eighth aspect is executed.

BRIEF DESCRIPTION OF DRAWINGS

To describe the technical solutions in the embodiments of this application more clearly, the following briefly introduces the accompanying drawings required for describing the embodiments.

DESCRIPTION OF EMBODIMENTS

Figure 1:
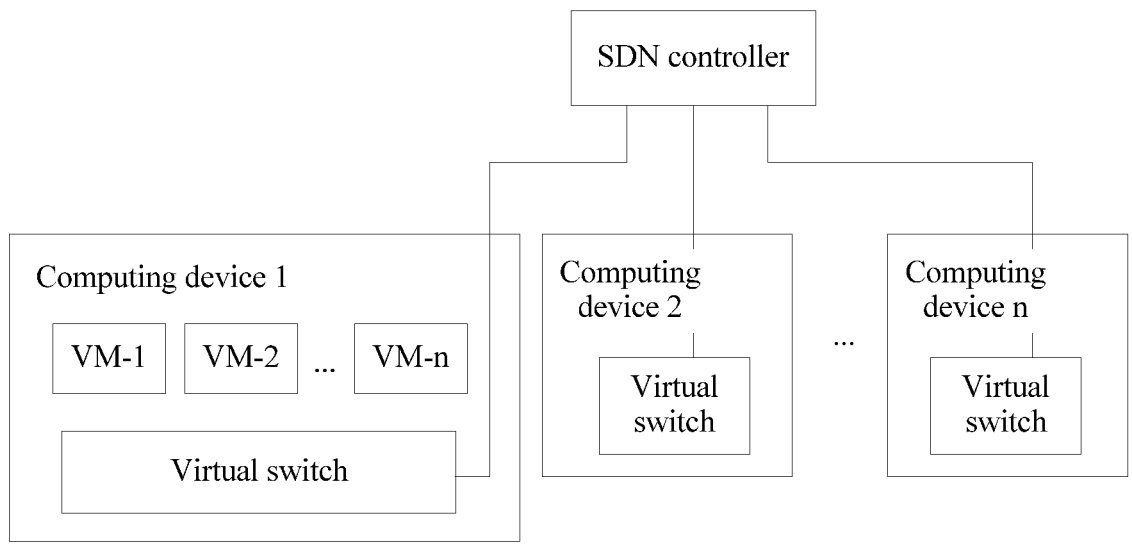
FIG. 1 is a schematic diagram of a data center architecture in the prior art.

The following describes the technical solutions in the embodiments of this application with reference to the accompanying drawings in the embodiments of this application.

In this application, terms such as first, second, and third are used to distinguish between objects, for example, a first data packet, a second data packet, and a third data packet. However, there is no logical or time-sequential dependency among all "first", "second", and "third".

Throughout this application, a data packet includes matching information and a payload. The matching information is used to match a match field of a flow table.

Throughout this application, a flow table is used to control a data flow in SDN, and may also be referred to as an SDN flow table. Specifically, a flow table in accordance with an OpenFlow™ protocol or a flow table in accordance with another protocol may be used. The flow table includes at least a match field and an execution field. The match field is used to match a data packet, and the execution field is used to indicate an action that is to be executed for a data packet that matches the flow table. The execution field includes a data packet action identifier, such as forwarding, discarding, and sending to an SDN controller. The execution field further includes data packet routing information, such as a destination port identifier of a data packet.

Throughout this application, a data flow indicates a series of data packets that can match a same flow table. Specifically, all matching information of data packets in a same data flow can match a match field of a flow table corresponding to the data flow.

Throughout this application, a virtual switch is a switching device that is installed on a computing device and that is implemented by using software, and is generally used in SDN. A common virtual switch includes an open vSwitch (OVS). The OVS is a virtual switch provided by an open source project.

Throughout this application, an overlay-type data packet refers to a data packet processed by using an overlay encapsulation technology. Specifically, the overlay encapsulation technology includes a VXLAN technology, an NVGRE technology, and an STT technology. The overlay-type data packet includes two parts: an overlay header and an original data packet. The original data packet refers to a data packet sent by a VM or a data packet sent to a VM through a virtual switch port. The original data packet is overlaid with the overlay header, so that the overlay-type data packet is transmitted in an overlay network. Different overlay encapsulation technologies are corresponding to different overlay headers.

Throughout this application, a flow table set includes one or more flow tables. Two flow table sets are included in this application, that is, a virtual-switch-accessible flow table set and a NIC-accessible flow table set. A flow table in a virtual-switch-accessible flow table set is used by the virtual switch, and a flow table in a NIC-accessible flow table set is used by the NIC. Specifically, as shown in FIG. 2c, a virtual-switch-accessible flow table set is generally stored in a storage device of a computing device; and a NIC-accessible flow table set may be stored in the storage device of the computing device, or may be stored in a storage device inside the NIC. If both the virtual-switch-accessible flow table set and the NIC-accessible flow table set are stored in a storage device of the computing device, the computing device separately reserves a block of memory space in the storage device for storing the virtual-switch-accessible flow table set and the NIC-accessible flow table set. In accompanying drawings in this application, an example that the NIC-accessible flow table set is stored in the storage device of the computing device is described. Persons skilled in the art may directly deduce a case in which the NIC-accessible flow table set is stored inside the NIC.

Throughout this application, an SR-IOV technology supporting a direct connection between a NIC and a VM is used as an example. In other embodiments, another technology supporting the direct connection between the NIC and the VM may be used.

SDN Architecture Applied to Embodiments of this Application

Figure 2A:
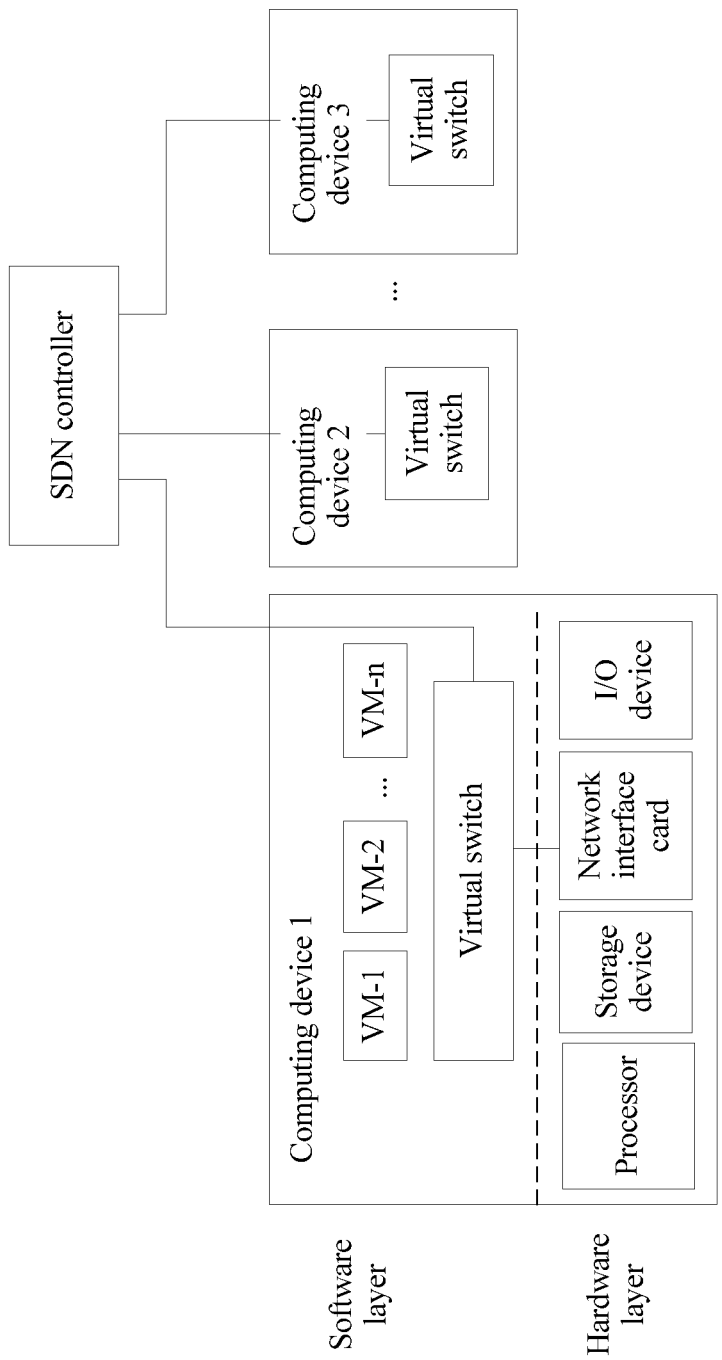
FIG. 2a is a schematic diagram of an SDN architecture according to an embodiment of this application.

FIG. 2a is a schematic diagram of an SDN architecture according to an embodiment of this application. A centralized SDN controller is schematically used in FIG. 2a. Alternatively, SDN controllers may also be deployed on computing devices in a distributed manner.

A NIC, a processor, and a storage device are disposed at a hardware layer of each computing device. In this application, parts of each computing device other than the NIC are referred to as a host. The processor may be a central processing unit (CPU). The storage device includes a volatile memory, such as a random-access memory (RAM), and a non-volatile memory, such as a read-only memory (ROM), a Flash memory, an HDD, or an SSD. When each host runs, a hardware layer of the host supports running of a virtual switch and multiple VMs that are at a software layer. In each computing device, a host establishes a communications connection to a NIC. The host communicates with an external network using the NIC. For example, first, the NIC obtains, from the external network, a data packet destined for a VM running on the host, and then sends the data packet to the VM running on the host; and a data packet sent to the external network by the VM running on the host is first sent to the NIC, and then sent to the external network by using the NIC.

Figure 2B:
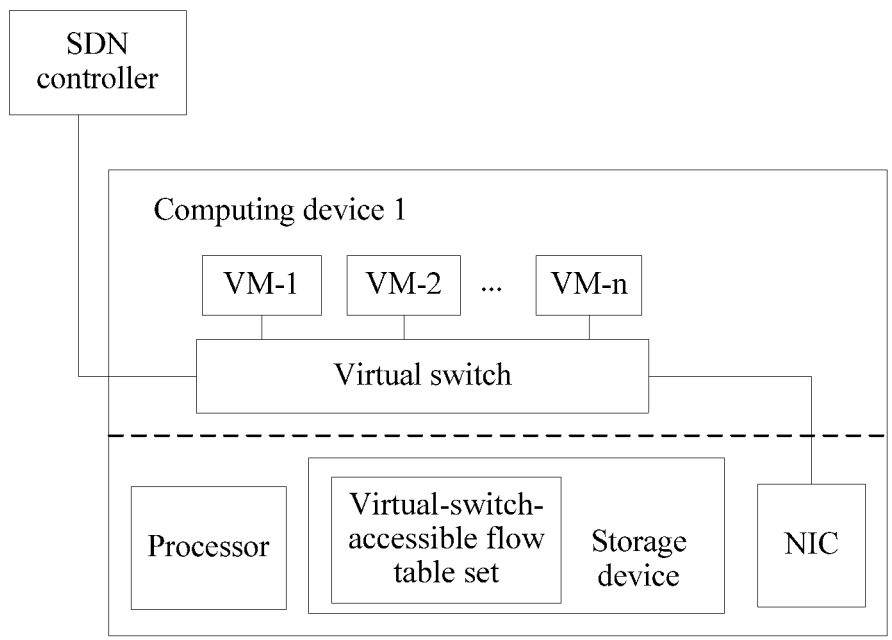
FIG. 2b is a schematic organizational structure diagram of a computing device in SDN in the prior art.
Figure 2C:
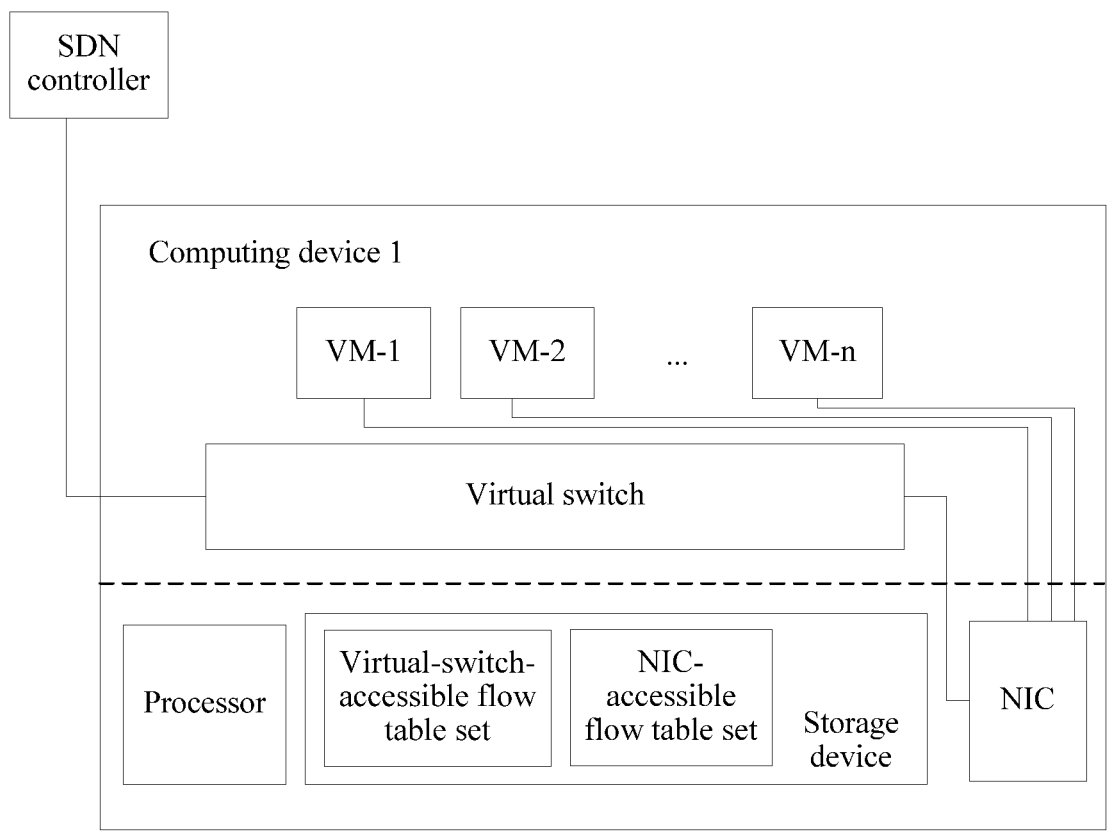
FIG. 2c is a schematic organizational structure diagram of a computing device according to an embodiment of this application.

Throughout this application, a computing device 1 is used as an example to demonstrate a difference between a data packet processing process in the prior art and a data packet processing process provided in this application. As shown in FIG. 2b, in the prior art, after a NIC in the computing device 1 receives a data packet from an external network, if it is determined that a destination of the data packet belongs to the computing device 1, the NIC sends the data packet to a virtual switch; and the virtual switch performs matching between the data packet and a flow table in a virtual-switch-accessible flow table set, and sends, according to an indication in a matched flow table, the data packet to a destination VM connected to the virtual switch. It can be learned from the foregoing data packet processing process that in the prior art, a main processing workload is centralized on the virtual switch in the data packet processing process. Running of the virtual switch relies on a resource at a hardware layer of the computing device. More processor and storage device resources occupied by the virtual switch indicate fewer resources available for running of the VM on the computing device. However, if an upper limit of resources that are at the hardware layer and that can be occupied by the virtual switch is specified, it is difficult to ensure performance of the virtual switch with an increase of data packet traffic.

As shown in FIG. 2c, in the data packet processing process provided in this application, after a NIC in the computing device 1 receives a data packet from an external network, if it is determined that a destination VM of the data packet runs on the computing device 1, the NIC performs matching between the data packet and a flow table in a NIC-accessible flow table set, and sends, according to an indication in a matched flow table, the data packet to a destination VM connected to the NIC. The flow table in the NIC-accessible flow table set comes from a host. If the NIC cannot obtain, by means of matching, a flow table in the NIC-accessible flow table set for the data packet, the NIC sends the data packet to a virtual switch. The virtual switch obtains, from an SDN controller, a flow table corresponding to the data packet, and sends the obtained flow table corresponding to the data packet to the NIC-accessible flow table set, so that the flow table can be used by the NIC in a subsequent data packet processing process.

It can be learned from the foregoing data packet processing process that in the data packet processing process provided in this application, some processing workload in the data packet processing process are transferred to the NIC. As a hardware device, the NIC not only has a higher processing efficiency, but also does not need to occupy another resource at the hardware layer during the operations.

It should be noted that all VMs on the computing device 1 in FIG. 2c are schematically connected to the NIC. Alternatively, it is possible that only some of the VMs are connected to the NIC, and the other VMs are connected to the virtual switch. For a specific configuration manner, not all VMs are limited to being connected to the NIC.

Figure 3:
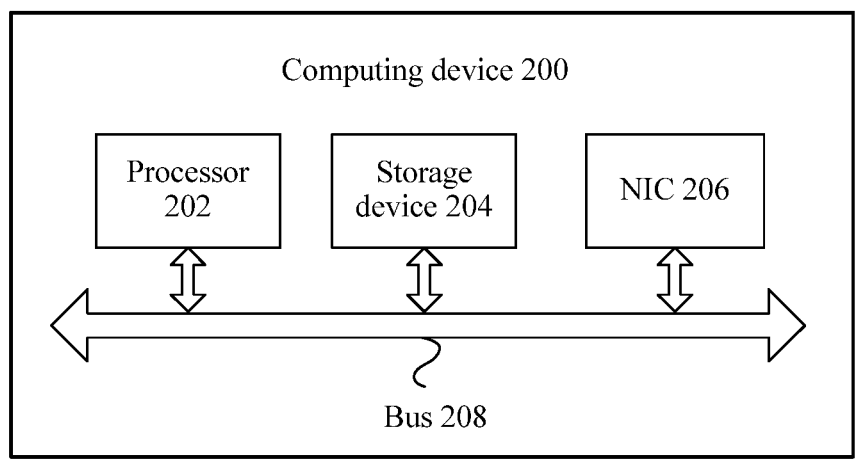
FIG. 3 is a schematic organizational structure diagram of another computing device according to an embodiment of this application.

The computing device in FIG. 2a and FIG. 2c may be implemented by using a computing device 200 shown in FIG. 3. A schematic organizational structure diagram of the computing device 200 is shown in FIG. 3. The computing device 200 includes a host and a NIC 206. The NIC 206 establishes, by using a bus 208 of the host, a communications connection to a processor 202 and a memory 204 of the host. The NIC 206, the processor 202, and the memory 204 may also communicate with each other using other communication mechanisms such as wireless transmission. The computing device 200 communicates with an external network by using the NIC 206.

Figure 4A:
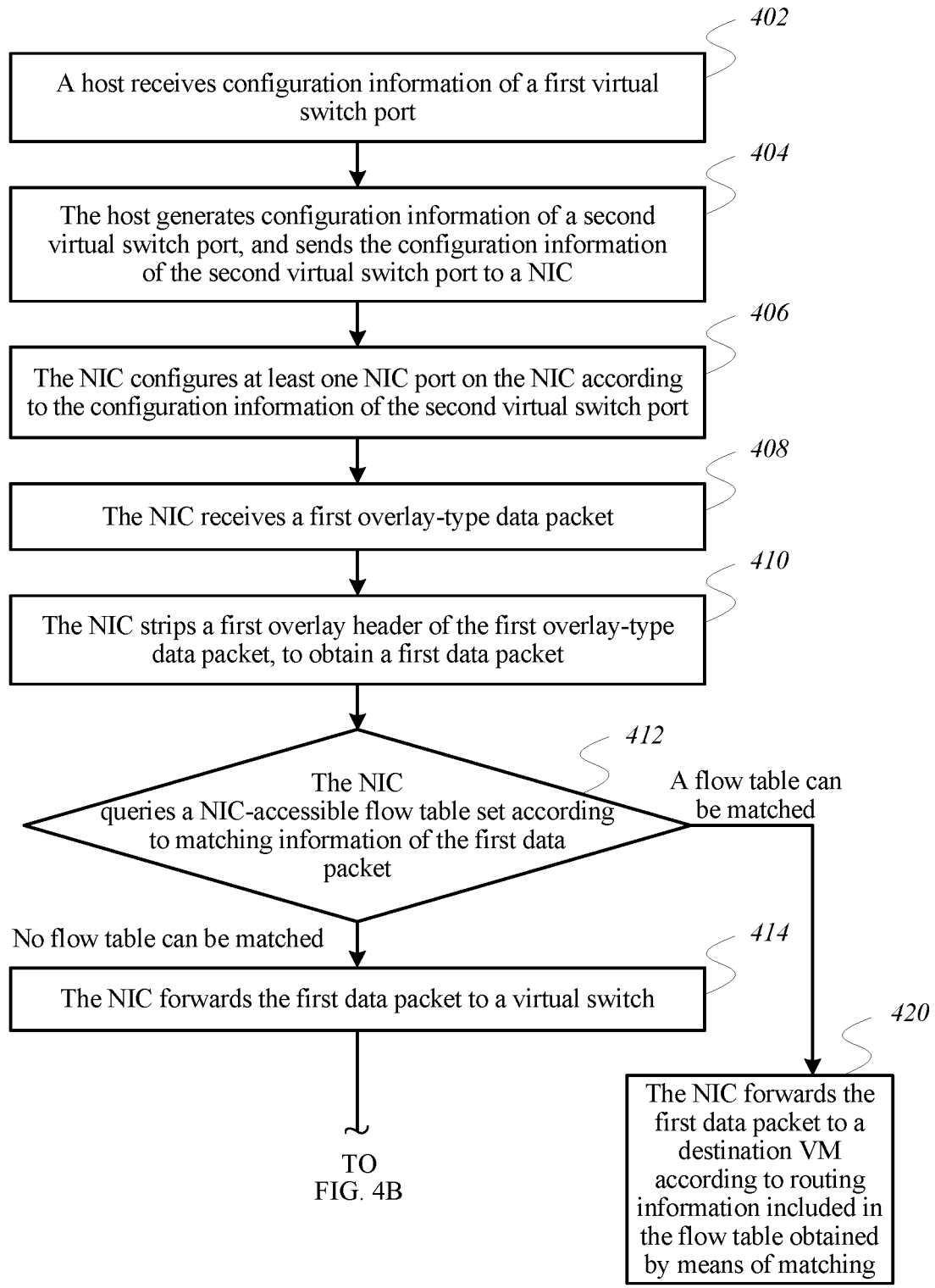
FIG. 4A and FIG. 4B are a schematic flowchart of a data packet processing method according to an embodiment of this application.
Figure 4B:
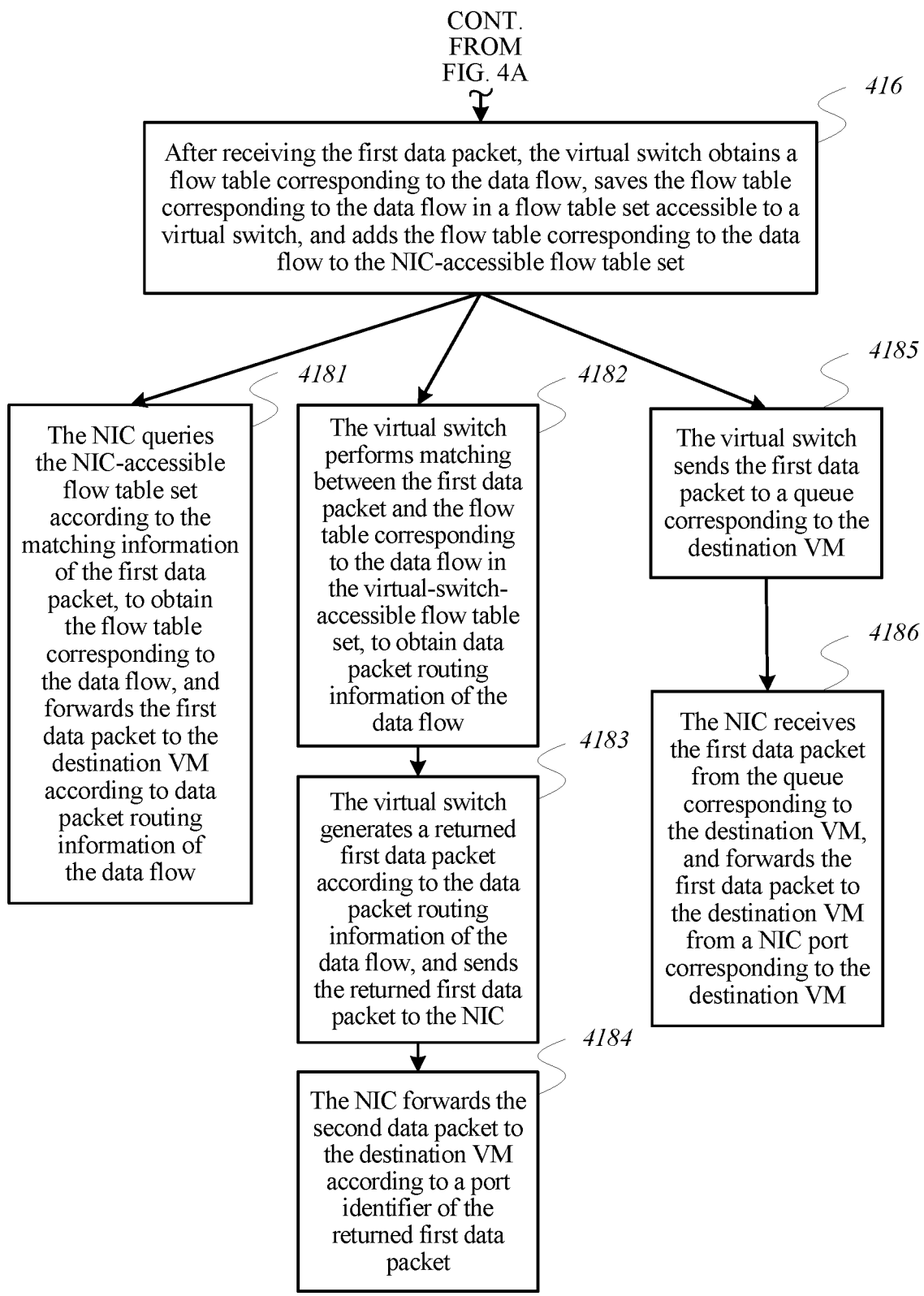

In an embodiment, at least one VM and a virtual switch run on the host, and program code used to implement a host-side method in a data packet processing method provided in FIG. 4A and FIG. 4B is stored in the storage device 204 and executed by the processor 202. In another embodiment, the NIC 206 performs a NIC-side method in the data packet processing method provided in FIG. 4A and FIG. 4B.

This application further provides a data packet processing method, and the computing device in the foregoing SDN architecture performs the method at runtime. A schematic flowchart of the method is shown in FIG. 4A and FIG. 4B.

In operation 402, a host of the computing device receives a first configuration information of virtual switch port, where the first configuration information of the virtual switch port instructs to establish at least one virtual switch port on a virtual switch, and each virtual switch port is corresponding to one VM running on the host.

In operation 404, the host generates a second configuration information of a virtual switch port, and sends the second configuration information of the virtual switch port to a NIC of the computing device.

Specifically, according to one embodiment, an interception module running on the host obtains the first configuration information of the virtual switch port, and sends the first configuration information of the virtual switch port to a NIC driver running on the host. The NIC driver generates the second configuration information of the virtual switch port according to the first configuration information of the virtual switch port, and sends the second configuration information of the virtual switch port to the NIC. The first configuration information of the virtual switch port and the second configuration information of the virtual switch port have a similar function. The NIC driver converts the first configuration information of the virtual switch port into the second configuration information of the virtual switch port mainly for a purpose of conforming to a specification of communication between the NIC driver and the NIC.

In operation 406, the NIC configures at least one NIC port on the NIC according to the second configuration information of the virtual switch port, where each NIC port connects, using an SR-I/OV technology, to one VM running on the host.

The NIC port may be specifically a port of a virtual function (VF) defined in the SR-I/OV technology.

Figure 5A:
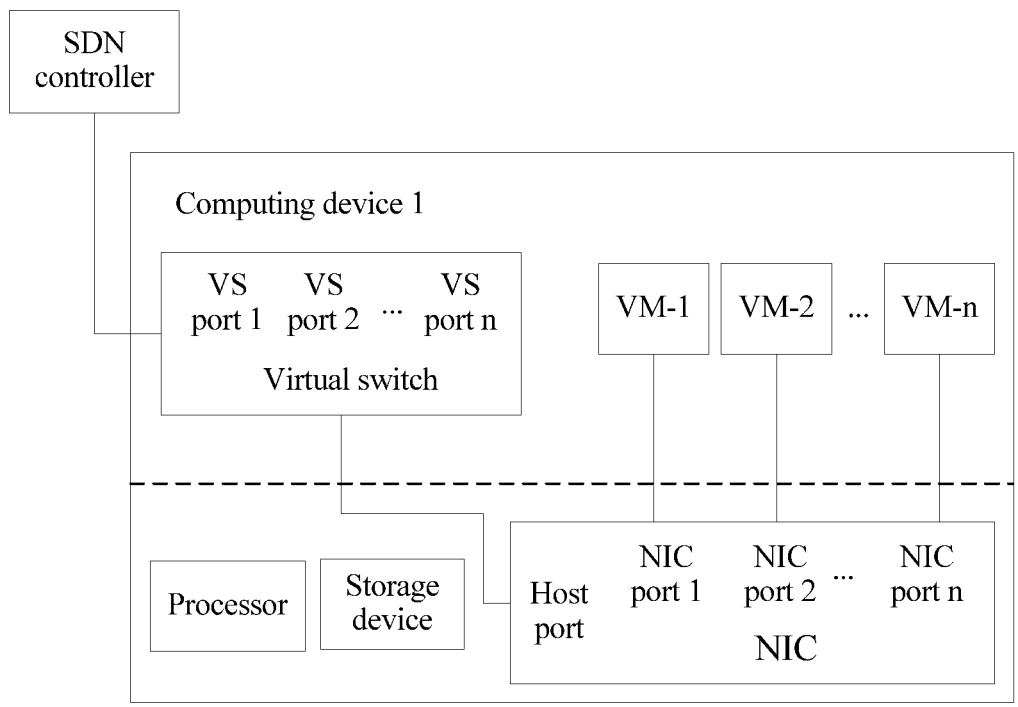
FIG. 5a is a schematic organizational structure diagram of another computing device according to an embodiment of this application.
Figure 5B:
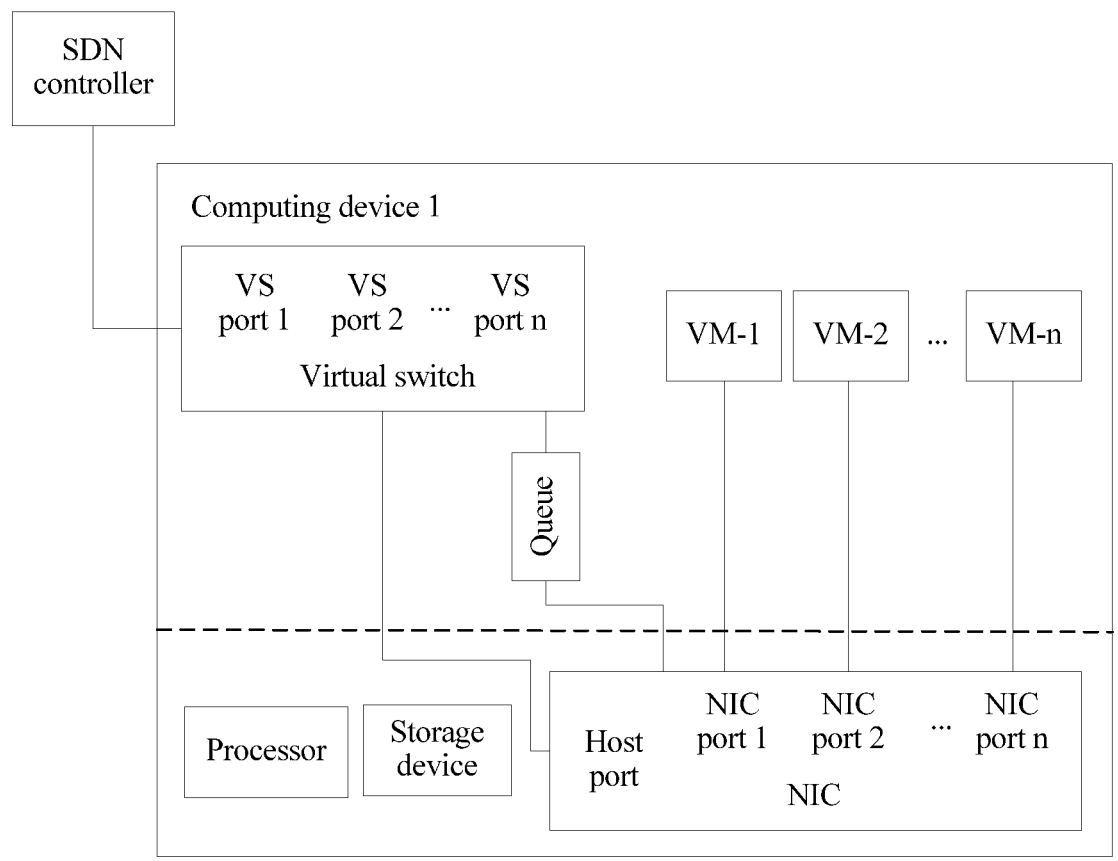
FIG. 5b is a schematic organizational structure diagram of another computing device according to an embodiment of this application.
Figure 5C:
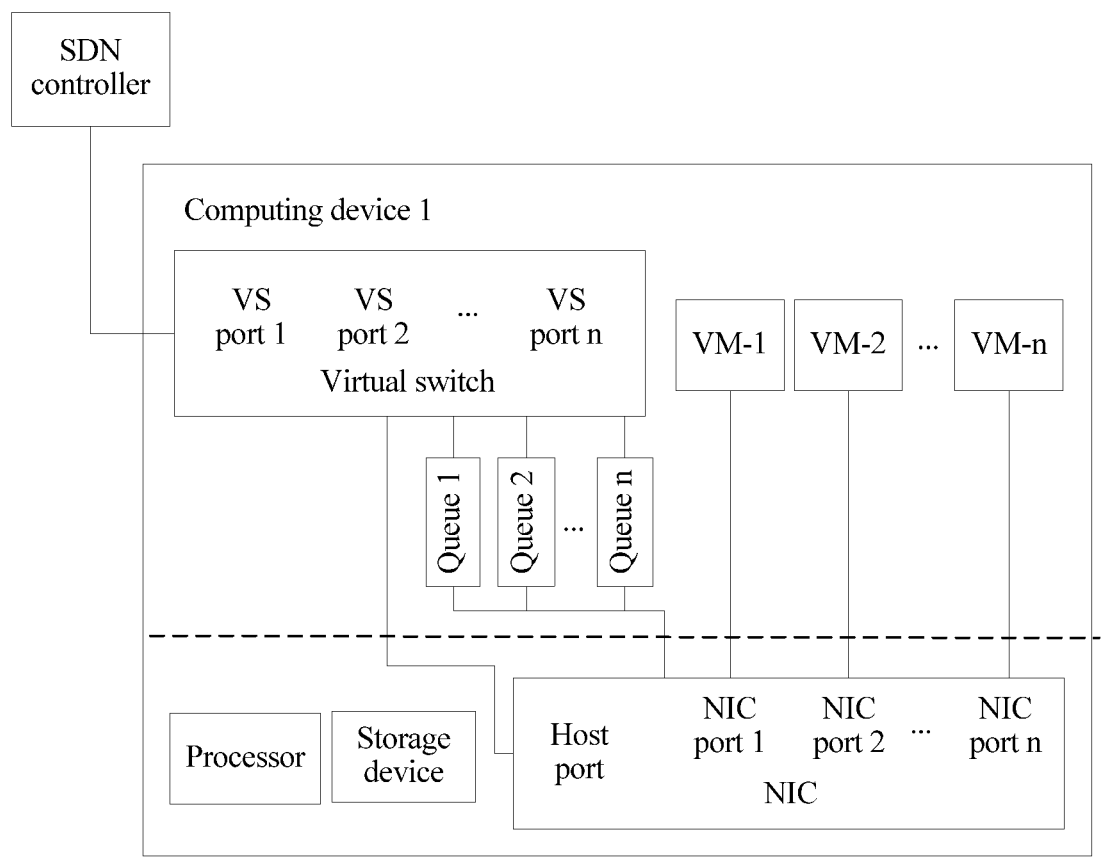
FIG. 5c is a schematic organizational structure diagram of another computing device according to an embodiment of this application.

Operations 402-406 are optional operations, and operation 402 to operation 406 are a configuration process of the virtual switch and the NIC. Operation 402 to operation 406 do not need to be necessarily performed each time before operation 408 and an operation subsequent to operation 408 are performed. As shown in FIG. 5a, FIG. 5b, or FIG. 5c, in this configuration process, the VM running on the host connects to the NIC via the NIC port. Although a VS port in a one-to-one correspondence with a VM is established on the virtual switch, the VM running on the host does not connect to the virtual switch.

Because the VS port is in a one-to-one correspondence with the VM, and the VM is in a one-to-one correspondence with the NIC port, the VS port is in a one-to-one correspondence with the NIC port. In a process of performing operation 402 to operation 406, a correspondence between a VS port and a NIC port is saved into the virtual switch, or a correspondence between a VS port and a NIC port is saved into the NIC.

As shown in FIG. 5b or FIG. 5c, in the configuration process of the virtual switch and the NIC, or before or after the configuration process of the virtual switch and the NIC, at least one queue needs to be further configured for communication between the virtual switch and the NIC. The queue is used by the virtual switch to return a data packet received from the NIC to the NIC. There are two queue configuration manners. As shown in FIG. 5b, manner 1 is as follows: the virtual switch communicates with the NIC by using one queue, and the virtual switch sends, to the queue, all data packets that need to be sent to the NIC. As shown in FIG. 5c, manner 2 is as follows: the virtual switch communicates with the NIC by using n queues, n is a quantity of VMs running on the host, and each queue is corresponding to one VM.

The configuration process does not need to be perceived by an upper-layer management device. The computing device connects, to the NIC, a VM supposed to connect to the virtual switch, and the upper-layer management device does not need to modify configuration information, thereby improving compatibility in the configuration process and reducing an implementation difficulty.

In operation 408, the NIC receives a first overlay-type data packet, where the first overlay-type data packet includes a first overlay header and a first data packet, and the first overlay header includes a VXLAN header, an NVGRE header, or an STT header.

The first overlay-type data packet may be sent by an external network to the NIC.

In operation 410, the NIC strips the first overlay header of the first overlay-type data packet, to obtain the first data packet.

Compared with an action of stripping the overlay header by the host in the prior art, an operating load of the host is reduced when the NIC strips the overlay header.

It should be noted that if the NIC directly receives the first data packet rather than the overlay-type data packet in operation 408, operation 410 does not need to be performed.

In operation 412, the NIC queries a NIC-accessible flow table set according to matching information of the first data packet; and if no flow table in the NIC-accessible flow table set can be obtained based on matching, performs operation 414, operation 416, and operation 4181, or operation 4182 to operation 4184, or operation 4185 and operation 4186, or if a flow table in the NIC-accessible flow table set can be obtained by means of matching, performs operation 420.

If the matching information of the first data packet cannot match any flow table in the NIC-accessible flow table set, the first data packet is the first data packet of a data flow which comprises the first data packet, or the first data packet is not the first data packet of the data flow, and a flow table corresponding to the data flow has been deleted from the NIC-accessible flow table set.

If the matching information of the first data packet can match a flow table in the NIC-accessible flow table set, it indicates that the flow table corresponding to the data flow which comprises the first data packet has been stored in the NIC-accessible flow table set.

In operation 414, the NIC forwards the first data packet to the virtual switch by using a host port.

The host port may be a port of a physical function (PF for short) defined in the SR-I/OV technology.

In operation 416, after receiving the first data packet, the virtual switch obtains a flow table corresponding to the data flow, and adds the flow table corresponding to the data flow to the NIC-accessible flow table set.

After obtaining the first data packet, the virtual switch sends the first data packet to an SDN controller, and receives the flow table that is generated by the SDN controller according to the first data packet and that is corresponding to the data flow. Alternatively, a virtual-switch-accessible flow table set may store information, such as a slow table, required for generating the flow table corresponding to the data flow. The virtual switch merely needs to generate the flow table corresponding to the data flow according to the information with no need to send the first data packet to the SDN controller.

The virtual switch saves the flow table corresponding to the data flow into the virtual-switch-accessible flow table set and the NIC-accessible flow table set. Alternatively, a monitoring module running on the host monitors the virtual switch to obtain the flow table corresponding to the data flow. The monitoring module saves the flow table corresponding to the data flow into the NIC-accessible flow table set.

The flow table corresponding to the data flow is generated by the SDN controller, and the SDN controller does not need to learn that the VM running on the host is actually connected to the NIC. Therefore, data packet routing information of the data flow may specifically include a VS port identifier. Because the VS port is in a one-to-one correspondence with the VM, and the VM is in a one-to-one correspondence with the NIC port, the VS port is in a one-to-one correspondence with the NIC port. The data packet routing information of the data flow indicates a NIC port of a destination VM.

After operation 416, there are three optional ways or methods for sending the first data packet to a destination VM of the first data packet. The three optional methods are respectively: operation 4181, operation 4182 to operation 4184, and operation 4185 and operation 4186. Alternatively, any one of the three methods may be executed after operation 416.

In operation 4181, the NIC queries the NIC-accessible flow table set according to the matching information of the first data packet, to obtain the flow table corresponding to the data flow, and forwards the first data packet to a destination VM according to data packet routing information of the data flow.

In this case, the NIC needs to store a correspondence between a VS port identifier and a NIC port identifier. After obtaining a VS port identifier included in the data packet routing information of the data flow, the NIC converts the VS port identifier into a NIC port identifier, and sends the first data packet from a NIC port corresponding to the NIC port identifier.

After storing the flow table corresponding to the data flow into the NIC-accessible flow table set in operation 416, the virtual switch or the monitoring module sends a notification message to the NIC. The notification message is used to notify the NIC that the flow table corresponding to the data flow has been stored in the NIC-accessible flow table set. After receiving the notification message, the NIC can obtain, by means of matching according to the matching information of the first data packet, the flow table corresponding to the data flow in the NIC-accessible flow table set.

Alternatively, after operation 414, the NIC periodically attempts to match a flow table in the NIC-accessible flow table set according to the matching information of the first data packet. After performing of operation 416 is completed, during next matching, the NIC can obtain, by means of matching according to the matching information of the first data packet, the flow table corresponding to the data flow in the NIC-accessible flow table set.

In the optional operation 4181, the virtual switch does not need to perform matching between the first data packet and the flow table corresponding to the data flow, and an operating load of the virtual switch is reduced.

In operation 4182, the virtual switch performs matching between the first data packet and the flow table that is corresponding to the data flow and that is in the virtual-switch-accessible flow table set, to obtain data packet routing information of the data flow.

In operation 4183, the virtual switch generates a returned first data packet according to the data packet routing information of the data flow, and sends the returned first data packet to the NIC, where the returned first data packet includes a port identifier corresponding to a destination VM, and the port identifier is a virtual switch port identifier or a NIC port identifier.

In operation 4184, the NIC receives the returned first data packet, and forwards the second data packet to the destination VM according to the port identifier.

As shown in FIG. 5b, as described in operation 416, the data packet routing information of the data flow may specifically include the VS port identifier. For example, the destination VM of the first data packet is a VM-1, a port that is on the virtual switch and that is corresponding to the VM-1 is a VS port 1, a port that is on the NIC and that is corresponding to the VM-1 is a NIC port 1, and the data packet routing information of the data flow includes the VS port 1. In operation 4183, the returned first data packet generated by the virtual switch includes a port identifier of the destination VM of the first data packet and the first data packet, and the port identifier of the destination VM of the first data packet is the VS port 1 or the NIC port 1.

Optionally, in operation 4183, the virtual switch adds the data packet routing information of the data flow to the returned first data packet, so that the port identifier of the destination VM is the VS port 1; and sends the returned first data packet to the NIC using a queue. In this case, the NIC needs to store the correspondence between a VS port identifier and a NIC port identifier. After receiving the returned first data packet, the NIC converts the VS port 1 into the NIC port 1, and sends the first data packet to the VM-1 by using the NIC port 1. In this implementation manner, the virtual switch has a lower load, and operating efficiency of the host is improved.

Optionally, in operation 4183, after obtaining the data packet routing information of the data flow, the virtual switch converts the VS port 1 included in the data packet routing information of the data flow into the NIC port 1, and adds the NIC port 1 to the returned first data packet, so that the port identifier of the destination VM is the NIC port 1; and sends the returned first data packet to the NIC by using a queue. In this case, the virtual switch needs to store the correspondence between a VS port identifier and a NIC port identifier. After receiving the returned first data packet, the NIC sends the first data packet to the VM-1 by using the NIC port 1. In this implementation manner, the NIC does not need to convert the port identifier, so that a data packet can be processed more efficiently.

In operation 4185, the virtual switch sends the first data packet to a queue corresponding to a destination VM. The virtual switch communicates with the NIC by using at least one queue, and each VM running on the host is corresponding to one queue.

In operation 4186, the NIC receives the first data packet from the queue corresponding to the destination VM, and the NIC forwards, according to queue information of the queue corresponding to the destination VM, the first data packet to the destination VM from a NIC port corresponding to the destination VM.

As shown in FIG. 5c, the virtual switch communicates with the NIC by using at least n queues, n is a quantity of VMs running on the host, and each queue is corresponding to one VM. The virtual switch performs matching between the first data packet and the flow table corresponding to the data flow in the virtual-switch-accessible flow table set. After obtaining the data packet routing information of the data flow, for example, the VS port 1, where the VS port 1 is corresponding to the VM-1, and the VM-1 is corresponding to a queue 1, the virtual switch sends the first data packet to the queue 1.

The NIC obtains the first data packet from the queue 1. The NIC driver running on the host sends queue information to the NIC, and the queue information is used to notify the NIC that the first data packet comes from the queue 1. The queue 1 is corresponding to the VM-1, and the VM-1 is corresponding to the NIC port 1. Therefore, the NIC sends the first data packet to the VM-1 by using the NIC port 1. In this manner, the NIC is required to store a correspondence between a queue and a NIC port. Compared with the foregoing two optional solutions, in this implementation manner, neither the virtual switch nor the NIC needs to convert the data packet routing information of the data flow into the NIC port identifier, and data packet forwarding efficiency is improved.

Alternatively, in SDN, a security group is generally configured on the VM. Therefore, after the destination VM of the first data packet is confirmed in the three optional solutions, optionally, the first data packet cannot be sent to the destination VM of the first data packet until the first data packet passes a security group check.

Optionally, according to one embodiment, if a static security group is configured, it is first determined whether the destination VM of the first data packet belongs to a static security group. If it is determined that the destination VM of the first data packet belongs to a static security group, it is determined whether the first data packet can match any rule of the static security group, and if the first data packet can match at least one rule of the static security group, the first data packet passes a static security group check. If the destination VM of the first data packet does not belong to any static security group, a static security group check does not need to be performed on the first data packet, and the first data packet is directly processed according to a first preset rule. For example, the first data packet is sent to the destination VM of the first data packet. If the destination VM of the first data packet belongs to a static security group, but the first data packet cannot match any rule of the static security group, the first data packet cannot pass the security group check, and the first data packet is then processed according to a second preset rule. For example, the first data packet is discarded.

The foregoing is a scenario in which a whitelist is configured in the static security group. Contrary to the scenario in which the whitelist is configured, in a scenario in which a blacklist is configured in the static security group, according to one embodiment, if the first data packet belongs to a static security group, but cannot match any rule of the static security group, the first data packet passes the security group check. If the destination VM of the first data packet belongs to a static security group, and the first data packet can match at least one rule of the static security group, the first data packet cannot pass the static security group check.

Optionally, according to one embodiment, if a dynamic security group is configured, it is first determined whether the destination VM of the first data packet belongs to the dynamic security group. If the destination VM belongs to the dynamic security group, a connection track table is queried according to the first data packet, to confirm which connection the first data packet belongs to, and determine a status of the connection of the first data packet and a processing action corresponding to the first data packet. For example, if the processing action of the first data packet instructs to forward the first data packet to the destination VM of the first data packet, the first data packet passes a dynamic security group check.

The static security group and the dynamic security group in the foregoing may be both configured. In this case, a data packet passing both the static security group check and the dynamic security group check passes the security group check. After operation 416, when operation 4182 to operation 4184 or operation 4185 and operation 4186 are performed, the security group check may be implemented by a security group module running on the host. Therefore, if the security group module confirms that the first data packet cannot pass the security group check, the first data packet does not need to be sent to the NIC, and operating efficiency of the NIC is improved. After operation 416, when operation 4181 is performed, the security group check for a data packet sent to the virtual switch may be performed by the NIC after the data packet is sent back to the NIC.

In operation 420, the NIC forwards the first data packet to a destination VM of the first data packet according to routing information included in a matched flow table.

The NIC obtains, by means of matching in the NIC-accessible flow table set according to the matching information of the first data packet, a flow table corresponding to a data flow which comprises the first data packet, and forwards the first data packet to the destination VM of the first data packet according to data packet routing information of the data flow included in the flow table.

In operation 412, the NIC can match the first data packet with a flow table in the NIC-accessible flow table set. Therefore, the first data packet is not the first data packet of the data flow which comprises the first data packet.

In operation 420, after the NIC obtains the routing information included in the matched flow table, the foregoing security group check process is performed. Optionally, after confirming that the first data packet passes the security group check, the NIC sends the first data packet to the destination VM of the first data packet.

After operation 4181, operation 4184, operation 4186, or operation 420, when the NIC continues to receive a subsequent data packet of the data flow, for example, a second overlay data packet, where the second overlay data packet includes a second data packet and a second overlay header corresponding to the second data packet, if the flow table corresponding to the data flow is still stored in the NIC-accessible flow table set, the NIC forwards the second data packet to the destination VM according to the data packet routing information of the data flow. However, the flow table in the NIC-accessible flow table set may be updated with time. Although the flow table corresponding to the data flow is added to the NIC-accessible flow table set in operation 416, when the NIC cannot obtain, based on matching, any flow table in the NIC-accessible flow table set according to matching information of the second data packet, operation 414, operation 416, and operation 4181, or operation 4182 to operation 4184, or operation 4185 and operation 4186 are performed for the subsequent data packet.

In the data packet processing method, according to one embodiment, a function of performing matching between a data packet and a flow table is transferred to a NIC, so that an operating load of a virtual switch is reduced, a VM can be better served by using a resource at a hardware layer of a host, and operating efficiency of a computing device is improved.

Figure 5D:
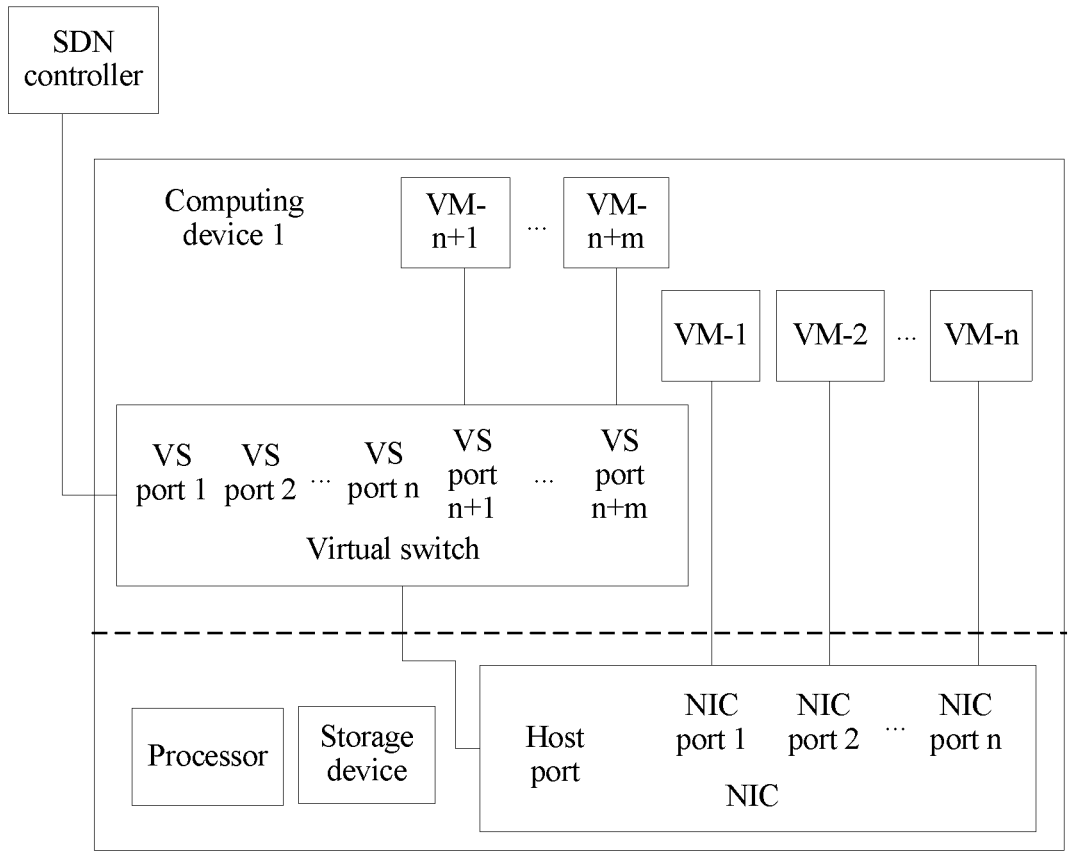
FIG. 5d is a schematic organizational structure diagram of another computing device according to an embodiment of this application.

Referring to FIG. 5d, FIG. 5d is a schematic structural diagram of another computing device according to this application. Different from that in FIG. 5a, FIG. 5b, or FIG.

5c, a VM-1 to a VM-n on the computing device are connected to a NIC, and a VM-n+1 to a VM-n+m are connected to a virtual switch. Configuration of the VM-n+1 to the VM-n+m may be completed before the configuration process of the virtual switch and the NIC in FIG. 4A and FIG. 4B is performed. Alternatively, in the configuration process of the virtual switch and the NIC in FIG. 4A and FIG. 4B, the VM-n+1 to the VM-n+m are selectively connected to the virtual switch, and the VM-1 to the VM-n are selectively connected to the NIC. Specifically, according to a load status of a host or according to information carried in configuration information received by the host, it may be configured as follows: some VMs are connected to the NIC, and the rest of the VMs are connected to the virtual switch.

In a scenario of FIG. 5d, according to one embodiment, when the NIC receives a data packet sent by an external network, if a destination VM of the data packet is connected to the NIC, the foregoing data packet processing method in FIG. 4A and FIG. 4B is executed on the data packet; or if a destination VM of the data packet is connected to the virtual switch, the NIC directly sends the data packet to the virtual switch. The virtual switch completes flow table matching of the data packet, and sends the data packet to the destination VM of the data packet. Specifically, in one embodiment, the NIC may implement the foregoing function based on flow table setting. For example, a flow table corresponding to a data flow in which a data packet whose destination VM is connected to the virtual switch is located is not stored in a NIC-accessible flow table set. When the NIC receives the data packet whose destination VM is connected to the virtual switch, the NIC cannot obtain, based on matching, a flow table in the NIC-accessible flow table set, and sends the data packet to the virtual switch. Alternatively, the host modifies the flow table corresponding to the data flow in which the data packet whose destination VM is connected to the virtual switch, and then stores the flow table into the NIC-accessible flow table set. The modification of the flow table includes changing routing information of the flow table to a host port. When the NIC receives the data packet whose destination VM is connected to the virtual switch, a matched flow table in the NIC-accessible flow table set instructs to send the data packet to the virtual switch by using the host port.

Figure 6A:
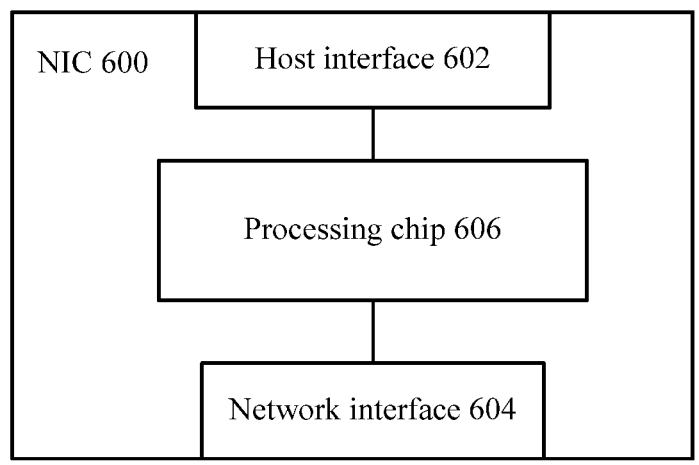
FIG. 6a is a schematic organizational structure diagram of a NIC according to an embodiment of this application.

This application further provides a NIC 600, and the NIC 600 may be the NIC provided in any one of the foregoing accompanying drawings. A schematic organizational structure diagram of the NIC 600 is shown in FIG. 6a, and the NIC 600 includes a host interface 602, a network interface 604, and a processing chip 606. The network interface 604 is configured to communicate with an external network, and the network interface 604 establishes a communications connection to the processing chip 606. The host interface 602 is configured to communicate with a virtual switch, a VM, a NIC driver, and the like that are running on a host connected to the NIC 600. The host interface 602 establishes a communications connection to the processing chip 606. In the foregoing data packet processing method, a NIC port established on the NIC and a host port are virtual ports, and alternatively, the host port and the NIC port implement communication with the host via the host interface 602. Alternatively, the host interface 602 may be an interface for connecting the NIC 600 and a bus of a computing device such as computing device 200 as shown in FIG. 3.

Referring now to FIG. 6a, host interface 602 is configured to obtain configuration information of a virtual switch port from the host connected to the NIC, and send the configuration information of the virtual switch port to the processing chip 606.

The processing chip 606 is configured to connect, according to the configuration information of the virtual switch port, the NIC 600 and the VM running on the host.

Specifically, reference may be made to the foregoing operation 406. The processing chip 606 configures at least one NIC port on the NIC according to the configuration information of the virtual switch port, and each NIC port is corresponding to one VM running on the host.

The foregoing describes functions of all units of the NIC 600 in a configuration process of the NIC 600. The NIC 600 may further be configured to process a data packet, and reference may be made to step 408 and a step after step 408 in the foregoing data packet processing method.

The network interface 604 is further configured to receive a first overlay-type data packet, and reference may be made to operation 408.

The network interface 604 sends the received first overlay-type data packet to the processing chip 606.

The processing chip 606 is further configured to: after receiving the first overlay-type data packet, process the first overlay-type data packet with reference to the foregoing operation 410 and operation 412.

The processing chip 606 is further configured to perform operation 412. When it is determined in operation 412 that the first data packet cannot match any flow table in a NIC-accessible flow table set, operation 414 and a subsequent operation are performed. Alternatively, when it is determined in operation 412 that the first data packet can match a flow table in a NIC-accessible flow table set, operation 420 is performed.

After operation 414, the processing chip 606 executes any one of three optional solutions. The three optional solutions are respectively corresponding to the foregoing operation 4181, a part executed by a NIC side in the foregoing operation 4182 to operation 4184, and a part executed by the NIC side in the foregoing operation 4185 and operation 4186.

An optional solution 1 is corresponding to the foregoing operation 4181. The processing chip 606 queries the NIC-accessible flow table set according to matching information of the first data packet, to obtain a flow table corresponding to a data flow which comprises the first data packet, that is, to obtain a VS port identifier included in data packet routing information of the data flow, and converts the VS port identifier into a NIC port identifier.

An optional solution 2 is corresponding to the part executed by the NIC side in the foregoing operation 4182 to operation 4184. The processing chip 606 receives the returned first data packet, and the processing chip 606 obtains a NIC port identifier according to a port identifier carried in the returned first data packet. If the port identifier is a virtual switch port identifier, the processing chip 606 converts the virtual switch port identifier into a NIC port identifier. The port identifier may also be a NIC port identifier.

An optional solution 3 is corresponding to the part executed by the NIC side in the foregoing operation 4185 and operation 4186. The processing chip 606 receives the first data packet from one queue in n queues. Because a correspondence between each queue and a NIC port is preconfigured in the processing chip 606, the processing chip 606 may obtain a NIC port identifier corresponding to the queue from which the first data packet is received.

The processing chip 606 performs operation 412. When determining that the first data packet can match a flow table in the NIC-accessible flow table set, the processing chip 606 obtains data packet routing information of the data flow included in the matched flow table. The data packet routing information of the data flow may include a VS port identifier, and the processing chip 606 converts the VS port identifier into a NIC port identifier.

After the processing chip 606 performs operation 412, regardless of whether the first data packet can match a flow table in the NIC-accessible flow table set, the processing chip 606 obtains a NIC port identifier corresponding to the first data packet, and the NIC port identifier is corresponding to a destination VM of a data flow which comprises the first data packet. After determining the destination VM of the first data packet, the processing chip 606 is further configured to perform a security group check on the first data packet. After determining that the first data packet passes the security group check, the processing chip 606 sends the first data packet to the destination VM via the host interface 602. For a specific process in which the processing chip 606 performs the security group check on the first data packet, reference may be made to the foregoing data packet processing method.

It should be noted that if the network interface 604 receives a non-overlay-type data packet, the processing chip 606 does not need to perform step 410.

The foregoing provided NIC implements a flow table matching function. A data packet in a NIC-accessible flow table set does not need to be sent to a virtual switch for processing, thereby reducing a load of a host, and improving operating efficiency of a host connected to the NIC.

The processing chip 606 may be implemented by using an application-specific integrated circuit (ASIC), or implemented by using a programmable logic device (PLD). The foregoing PLD may be a complex programmable logical device (CPLD), a field programmable gate array (FPGA), a generic array logic (GAL), or any combination thereof.

Figure 6B:
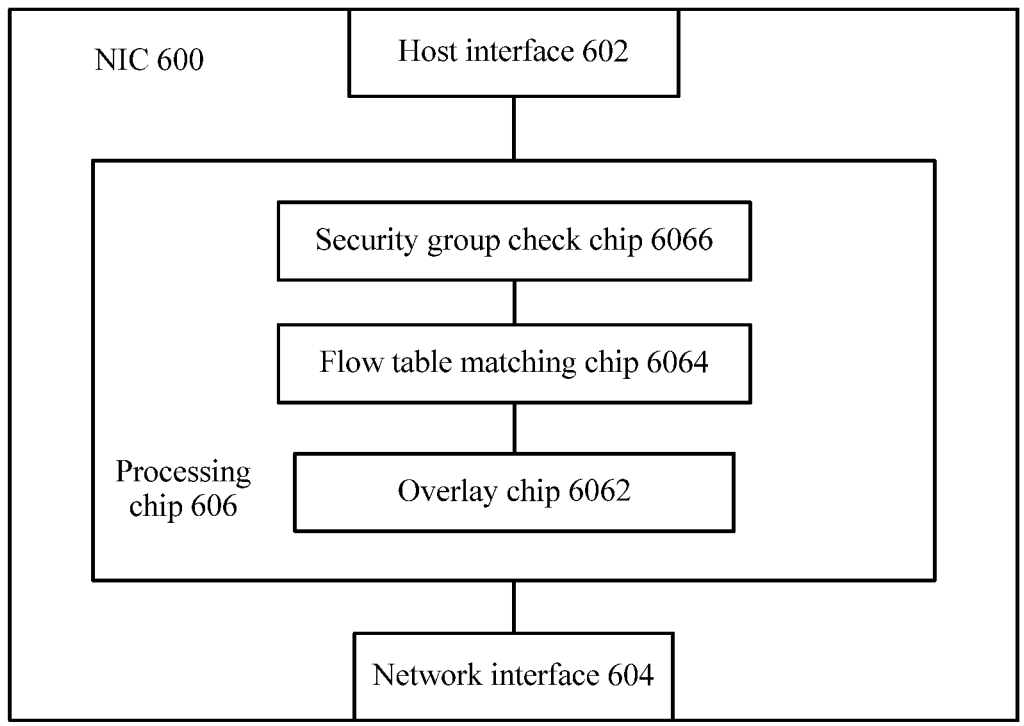
FIG. 6b is a schematic organizational structure diagram of another NIC according to an embodiment of this application.

Specifically, as shown in FIG. 6*b*, the processing chip 606 may include an overlay chip or logic 6062, a flow table matching chip or logic 6064, and a security group check chip or logic 6066. The overlay chip 6062 is configured to strip an overlay header of an overlay-type data packet sent by the network interface 804 to the processing chip 606. The flow table matching chip 6064 is configured to perform matching between a data packet whose overlay header is stripped and a flow table stored in the NIC-accessible flow table set. The security group check chip 6066 is configured to determine whether a data packet that matches a flow table in the flow table matching chip 8064 passes a security group check, and send, to a destination VM by using the host interface 602, the data packet passing the security group check. The overlay chip 6062 and the security group check chip 6066 are optional components.

Figure 6C:
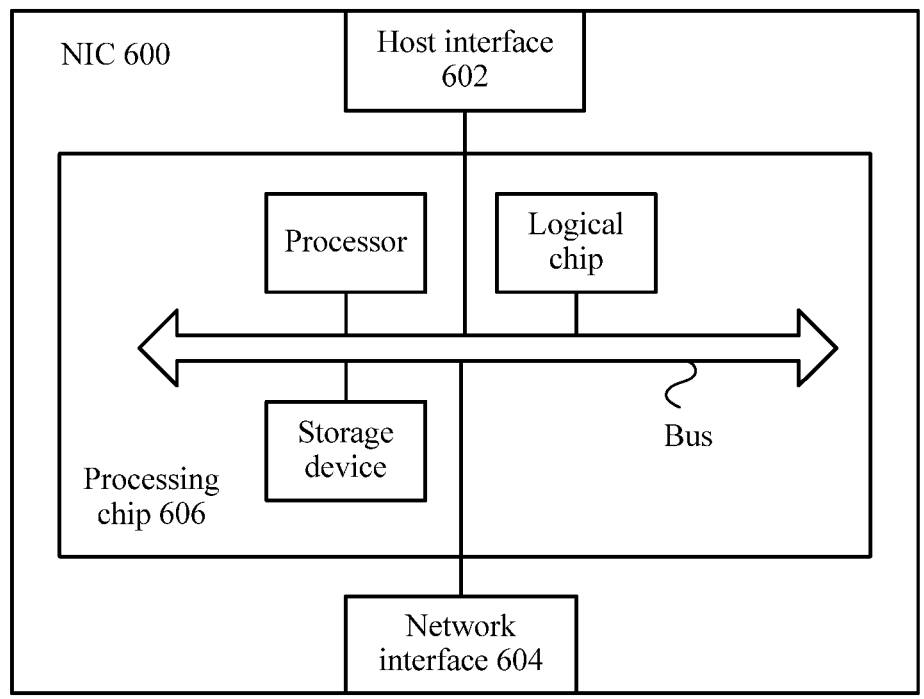
FIG. 6c is a schematic organizational structure diagram of another NIC according to an embodiment of this application.

The processing chip 606 may further be implemented as a processor, a storage device, and/or a logical chip. The logical chip may be implemented by using a PLD or an ASIC. When the processing chip 606 runs, the processor and the logical chip separately execute some functions that may be allocated in multiple manners. For example, as shown in FIG. 6*c*, the logical chip is configured to strip an overlay header of an overlay-type data packet sent by the network interface 604 to the processing chip 606. When running, the processor in the processing chip 606 reads code in a memory, so as to read a flow table in the NIC-accessible flow table set, and send the logical chip the flow table in the NIC-accessible flow table set, so that the logical chip performs matching between the data packet whose overlay header is stripped and the flow table. The processor is further configured to read information required for performing a security group check, and send the information required for performing a security group check to the logical chip, so that the logical chip performs a security group check on the data packet.

In the processing chip 606 of the NIC 600 shown in FIG. 6*c*, the logical chip may also include an overlay sub-chip, a flow table matching sub-chip, and a security group check sub-chip. The overlay sub-chip and the security group check sub-chip are optional components. The overlay sub-chip is configured to strip an overlay header of an overlay-type data packet. The processor in the processing chip 606 of the NIC 600 shown in FIG. 6*c* is configured to obtain information required for flow table matching or performing a security group check, and send the information required for flow table matching or performing a security group check to the logical chip. The flow table matching sub-chip completes flow table matching of a data packet according to the information required for flow table matching. The security group check sub-chip completes a security group check on a data packet according to the information required for performing a security group check.

This application further provides a data packet processing method, and the NIC in any one of the foregoing accompanying drawings executes the method when running. For the method, reference may be specifically made to a part executed by a NIC side in the data packet processing method corresponding to FIG. 4A and FIG. 4B.

This application further provides a configuration method, and the host in any one of the foregoing accompanying drawings executes the method when running. For the method, reference may be specifically made to operation 402 and operation 404 in the data packet processing method corresponding to FIG. 4A and FIG. 4B.

This application further provides a data packet processing method, and the host in any one of the foregoing accompanying drawings executes the method when running. For the method, reference may be specifically made to a method executed by a host side after operation 408 in the data packet processing method corresponding to FIG. 4A and FIG. 4B. The method specifically includes operation 416 and a part of sending a notification message to the NIC after a flow table corresponding to a data flow is saved into a NIC-accessible flow table set in operation 4181, or operation 4182 and operation 4183, or operation 4185.

In the foregoing embodiments, the description of each embodiment has respective focuses. For a part that is not described in detail in an embodiment, reference may be made to related descriptions in other embodiments.

The method described with reference to disclosed content in this application may be implemented by executing a software instruction by a processor. The software instruction may include a corresponding software module. The software module may be stored in a RAM, a Flash memory, a ROM, an erasable programmable read only memory (EPROM for short), an electrically erasable programmable read-only memory (EEPROM for short), a hard disk, an optical disc, or a storage medium in any other form well-known in the art.

Persons skilled in the art should be aware that in one or more of the foregoing examples, functions described in this application may be implemented by using hardware or software. When the functions are implemented by software, these functions may be stored in a computer-readable medium or transmitted as one or more instructions or code in the computer-readable medium. The storage medium may be any available medium accessible to a general or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made based on the technical solutions of this application shall fall within the protection scope of this application.

What is claimed is:

1. A data packet processing method, wherein the method is applied to a computing device comprising a network interface card (NIC) and a host, wherein at least one virtual machine (VM) runs on the host, the method comprising:
receiving, by the NIC, a first data packet of a data flow;
matching, by the NIC, a flow table set according to matching information of the first data packet; and
forwarding, by the NIC, the first data packet to a virtual switch running on the host when the matching is failed;
receiving, by the virtual switch, the first data packet;
obtaining, by the virtual switch, a flow table corresponding to the data flow from a software-defined networking (SDN) controller;
updating the flow table set by storing, by the virtual switch, the flow table corresponding to the data flow into the flow table set;
re-matching, by the NIC, the flow table set according to matching information of the first data packet; and
sending, by the NIC, the first data packet to a target VM according to the matched flow table.

2. The data packet processing method according to claim 1, wherein at least one virtual switch port is configured on the virtual switch, one of the at least one virtual switch port corresponding to one of the at least one VM running on the host, and the method further comprises:
receiving, by the NIC, configuration information; and
configuring, by the NIC, a NIC port on the NIC according to the configuration information, wherein the NIC port connects, using a single-root input/output virtualization (SR-I/OV) technology, to the VM.

3. The data packet processing method according to claim 2, wherein the flow table corresponding to the data flow comprises data packet routing information of the data flow.

4. The data packet processing method according to claim 1, wherein the first data packet of the data flow is an overlay-type data packet, wherein the overlay-type data packet comprises an overlay header and the first data packet, the overlay header comprises a virtual extensible local area network (VXLAN) header, a network virtualization using generic routing encapsulation (NVGRE) header, or a stateless transport tunneling (STT) header; wherein the method further comprises:
stripping, by the NIC, the overlay header to obtain the first data packet.

5. The data packet processing method according to claim 1, wherein the method further comprises:
performing, by the NIC, a security group check on the first data packet; and
determining, by the NIC, whether the first data packet passes the security group check.

6. A network interface card (NIC) comprising:
a host interface;
a network interface; and
a processing chip, wherein the network interface is configured to communicate with the processing chip, the host interface is configured to communicate with a host, wherein at least one virtual machine (VM) runs on the host, and the host interface is configured to communicate with the processing chip,
wherein the processing chip is configured to:
receive a first data packet of a data flow through the network interface,
match a flow table set according to matching information of the first data packet,
forward, through the host interface, the first data packet to a virtual switch running on the host when the matching is failed;
re-match the flow table set according to matching information of the first data packet after the flow table set is updated by the virtual switch, and wherein the updated flow table set includes a flow table corresponding to the data flow obtained from a software-defined networking (SDN) controller; and
send the first data packet to a target VM according to the matched flow table.

7. The NIC according to claim 6, wherein at least one virtual switch port is configured on the virtual switch, one of the at least one virtual switch port corresponding to one of the at least one VM running on the host, and
wherein the processing chip is further configured to:
receive configuration information, and configure a NIC port on the NIC according to the configuration information, wherein the NIC port connects, using a single-root input/output virtualization (SR-I/OV) technology, to the VM.

8. The NIC according to claim 6, wherein the first data packet of the data flow is an overlay-type data packet, wherein the overlay-type data packet comprises an overlay header and the first data packet, the overlay header comprises a virtual extensible local area network (VXLAN) header, a network virtualization using generic routing encapsulation (NVGRE) header, or a stateless transport tunneling (STT) header; wherein the processing chip is further configured to: strip the overlay header to obtain the first data packet.

9. The NIC according to claim 6, wherein the processing chip is further configured to: perform a security group check on the first data packet, and determine whether the first data packet passes the security group check.

10. A data packet processing method, wherein the method is applied to a computing device comprising a network interface card (NIC) and a host, wherein at least one virtual machine (VM) runs on the host, the method comprising:
receiving, by the NIC, a first data packet of a data flow;
matching, by the NIC, a flow table set according to matching information of the first data packet;
forwarding, by the NIC, the first data packet to a virtual switch running on the host when the matching is failed;
receiving, by the virtual switch, the first data packet;
obtaining, by the virtual switch, a flow table corresponding to the data flow from a software-defined networking (SDN) controller;
updating the flow table set by storing, by the virtual switch, the flow table corresponding to the data flow into the flow table set;
determining, by the virtual switch, data packet routing information of the data flow according to the flow table;
receiving, by the NIC, the data packet routing information; and
forwarding, by the NIC, the first data packet to a target VM according to the data packet routing information.

11. The data packet processing method according to claim 10, wherein at least one virtual switch port is configured on the virtual switch, one of the at least one virtual switch port corresponding to one of the at least one VM running on the host, and the method further comprises:
receiving, by the NIC, configuration information; and configuring, by the NIC, a NIC port on the NIC according to the configuration information, wherein the NIC port connects, using a single-root input/output virtualization (SR-I/OV) technology, to the VM.

12. The data packet processing method according to claim 11, wherein the data packet routing information of the data flow comprises a port identifier, wherein the port identifier comprises a virtual switch port identifier or a NIC port identifier;

wherein the NIC forwards the first data packet to a target VM through the NIC port according to the port identifier.

13. The data packet processing method according to claim 11, wherein the data packet routing information of the data flow comprises a queue corresponding to the target VM;

wherein the virtual switch stores the first data packet into the queue; wherein the NIC obtains the first data packet from the queue, and forward the first data packet to the VM through the NIC port.

14. The data packet processing method according to claim 10, wherein the first data packet of the data flow is an overlay-type data packet, wherein the overlay-type data packet comprises an overlay header and the first data packet, the overlay header comprises a virtual extensible local area network (VXLAN) header, a network virtualization using generic routing encapsulation (NVGRE) header, or a stateless transport tunneling (STT) header; wherein the method further comprises:

stripping, by the NIC, the overlay header to obtain the first data packet.

15. The data packet processing method according to claim 10, wherein the method further comprises:

performing, by the NIC, a security group check on the first data packet; and determining, by the NIC, whether the first data packet passes the security group check.

16. A network interface card (NIC) comprising:
a host interface;
a network interface; and
a processing chip, wherein the network interface is configured to communicate with the processing chip, the host interface is configured to communicate with a host, wherein at least one virtual machine (VM) runs on the host, and the host interface is configured to communicate with the processing chip,
wherein the processing chip is configured to:
receive a first data packet of a data flow; match a flow table set according to matching information of the first data packet; forward the first data packet to a virtual switch running on the host when the matching is failed;
receive data packet routing information corresponding to the data flow determined by the virtual switch, and wherein the virtual switch obtains a flow table corresponding to the data flow from a software-defined networking (SDN) controller and updates the updated flow table set by storing the flow table corresponding to the data flow; and
forward the first data packet to a target VM according to the data packet routing information.

17. The NIC according to claim 16, wherein at least one virtual switch port is configured on the virtual switch, one of the at least one virtual switch port corresponding to one of the at least one VM running on the host, and the processing chip is further configured to: receive configuration information; and configure a NIC port on the NIC according to the configuration information, wherein the NIC port connects, using a single-root input/output virtualization (SR-I/OV) technology, to the VM.

18. The NIC according to claim 17, wherein the data packet routing information of the data flow comprises a port identifier, wherein the port identifier comprises a virtual switch port identifier or a NIC port identifier;

wherein the NIC forwards the first data packet to a target VM through the NIC port according to the port identifier.

19. The NIC according to claim 17, wherein the data packet routing information of the data flow comprises a queue corresponding to the target VM;

wherein the virtual switch stores the first data packet into the queue; wherein the NIC obtains the first data packet from the queue, and forward the first data packet to the VM through the NIC port.

20. The NIC according to claim 16, wherein the first data packet of the data flow is an overlay-type data packet, wherein the overlay-type data packet comprises an overlay header and the first data packet, the overlay header comprises a virtual extensible local area network (VXLAN) header, a network virtualization using generic routing encapsulation (NVGRE) header, or a stateless transport tunneling (STT) header; wherein the processing chip is further configured to: strip the overlay header to obtain the first data packet.

21. The NIC according to claim 16, wherein the processing chip is further configured to: perform a security group check on the first data packet; and determine whether the first data packet passes the security group check.

* * * * *